United States Patent
Loccufier

(10) Patent No.: US 11,053,404 B2
(45) Date of Patent: Jul. 6, 2021

(54) ACYLPHOSPHINE OXIDE PHOTOINITIATORS

(71) Applicant: AGFA NV, Mortsel (BE)

(72) Inventor: Johan Loccufier, Mortsel (BE)

(73) Assignee: AGFA NV, Mortsel (BE)

( * ) Notice: Subject to any disclaimer, the term of this patent is extended or adjusted under 35 U.S.C. 154(b) by 276 days.

(21) Appl. No.: 16/096,702

(22) PCT Filed: Apr. 28, 2017

(86) PCT No.: PCT/EP2017/060171
§ 371 (c)(1),
(2) Date: Oct. 26, 2018

(87) PCT Pub. No.: WO2017/191043
PCT Pub. Date: Nov. 9, 2017

(65) Prior Publication Data
US 2019/0144695 A1    May 16, 2019

(30) Foreign Application Priority Data

May 4, 2016   (EP) .................... 16168238

(51) Int. Cl.
| | | |
|---|---|---|
| C09D 11/38 | (2014.01) | |
| C07F 9/6539 | (2006.01) | |
| C07F 9/32 | (2006.01) | |
| C09D 11/101 | (2014.01) | |
| C07F 9/6512 | (2006.01) | |
| C07F 9/6558 | (2006.01) | |
| C07F 9/53 | (2006.01) | |
| C07F 9/6518 | (2006.01) | |
| C09D 11/107 | (2014.01) | |
| C08K 5/5397 | (2006.01) | |

(52) U.S. Cl.
CPC ............ *C09D 11/38* (2013.01); *C07F 9/3252* (2013.01); *C07F 9/5337* (2013.01); *C07F 9/6512* (2013.01); *C07F 9/6518* (2013.01); *C07F 9/65395* (2013.01); *C07F 9/65583* (2013.01); *C07F 9/65586* (2013.01); *C09D 11/101* (2013.01); *C09D 11/107* (2013.01); *C08K 5/5397* (2013.01)

(58) Field of Classification Search
None
See application file for complete search history.

(56) References Cited

U.S. PATENT DOCUMENTS

| | | |
|---|---|---|
| 2015/0197651 A1 | 7/2015 | Fukagawa |
| 2015/0344711 A1 | 12/2015 | Shimono et al. |

FOREIGN PATENT DOCUMENTS

| | | |
|---|---|---|
| CN | 103130831 A | 6/2013 |
| EP | 2 902 456 A1 | 8/2015 |
| EP | 2 960 303 A1 | 12/2015 |
| WO | 03/019295 A1 | 3/2003 |
| WO | 2011/003772 A1 | 1/2011 |
| WO | 2015/031927 A1 | 3/2015 |
| WO | 2015/158718 A1 | 10/2015 |

OTHER PUBLICATIONS

Official Communication issued in International Patent Application No. PCT/EP2017/060171, dated Jul. 14, 2017.

*Primary Examiner* — Joseph R Kosack
(74) *Attorney, Agent, or Firm* — Stinson LLP

(57) ABSTRACT

Thiol modified acylphosphine oxide photoinitiators exhibiting improved smell and extractability are disclosed. Also disclosed is a UV curable inkjet ink containing an acylphosphine oxide photoinitiator and a polymerizable compound, wherein the acylphosphine oxide photoinitiator includes one or more acyl groups substituted by a thiol.

10 Claims, No Drawings

ACYLPHOSPHINE OXIDE PHOTOINITIATORS

CROSS REFERENCE TO RELATED APPLICATIONS

This application is a 371 National Stage Application of PCT/EP2017/060171, filed Apr. 28, 2017. This application claims the benefit of European Application No. 16168238.0, filed May 4, 2016, which is incorporated by reference herein in its entirety.

BACKGROUND OF THE INVENTION

1. Field of the Invention

The present invention relates to specific acylphosphine oxide photoinitiators and their use in UV curable compositions, such as UV curable inks, especially UV curable inkjet inks.

2. Description of the Related Art

UV curable compositions have generally been cured by doped mercury lamps. For reliable industrial inkjet printing systems and also for environmental reasons, there is a clear tendency from doped mercury lamps towards UV LED curing.

Acylphosphine oxide photoinitiators are highly preferred for efficient UV LED curing. However, this class of photoinitiators tends to generate medium volatile aldehydes, such as mesitaldehyde, giving an undesired background smell. For low migration radiation curable compositions and inks used in food packaging, these aldehydes represent undesired migrateables, usually referred to in food safety regulations as non-intentionally added substances (NIAS).

One approach to minimize these NIAS compounds is to use high molecular weight acylphosphine oxide type of photoinitiators wherein the acylphosphine oxide structure is linked to a main chain or a core of the component A on the side of an acyl group thereof as disclosed by US 2015344711 (FUJIFILM). However their impact on the viscosity of the radiation curable formulation strongly limits the formulation latitude in designing low viscous ink jet inks.

Another approach is to functionalize the aldehyde fragments in acylphosphine oxide type photoinitiators with polymerizable groups, preferably (meth)acrylates, to limit migration as disclosed in US 2015197651 (FUJIFILM). Such photoinitiators however enhance the skin irritating character of the photoinitiator or limits its application scope when combined with non-(meth)acrylate polymerizable compounds. In recent patent literature, there is a tendency to at least partially shift towards less skin irritating chemistry such as thiol-ene based curable systems as disclosed by WO 2015/158718 (MONTANUNIVERSITÄT LEOBEN). This led to the design of photoinitiators functionalized with less skin irritating polymerizable groups, such as with alkynes and vinyl carbonates, which have been disclosed in WO 2015/031927 (DURST). However, these types of photoinitiators have the disadvantage of only being compatible with thiol-ene or thiol-yne based radiation curable formulations. They are less suited for (meth)acrylate based formulations as these alkyne and vinyl carbonate groups often only copolymerize to a limited extent with (meth)acrylates, leaving part of the photoinitiator migrateable. It would be advantageous to have a photoinitiator type compatible with a broad scope of radiation curable systems.

WO 2011/003772 (BASF) discloses a thiol functionalized acylphosphine oxide as synthetic intermediate in the preparation of polymeric acylphosphine oxide photoinitiators. The thiol function is present on the phosphine oxide fragment offering no solution for migration of degradation products. Also all the examples in CN 103130831 (SHENZHEN UV CHEMICAL TECHNOLOGY CO) have the thiol functional group on the phosphine oxide fragment, again not bringing a solution for migration of the degradation products or bad smell.

There is still a need for acylphosphine oxide type of photoinitiators suitable for jettable radiation curable formulations, guaranteeing LED curability without generating bad smell or migrateable degradation products, while being compatible with a broad scope of radiation curable chemistry.

SUMMARY OF THE INVENTION

In order to overcome the problems described above, preferred embodiments of the present invention have been realised with a UV curable inkjet ink comprising an acylphosphine oxide photoinitiator and a polymerizable compound, wherein the acylphosphine oxide photoinitiator includes one or more acyl groups substituted by a thiol.

The acylphosphine oxide photoinitiator including one or more acyl groups substituted by a thiol is preferably an acylphosphine oxide photoinitiator as defined below.

Although mercaptans are well-known for causing bad smell, it was surprisingly found that introducing a thiol on the acyl group of the acylphosphine oxide photoinitiator reduced the bad smell cause by these photoinitiators after curing. Furthermore inkjet inks were made exhibiting minimal amounts of migrateables from a cured layer.

Another advantage of the acylphosphine oxide photoinitiators is that their handling in manufacturing of UV curable inkjet inks become less strict than acylphosphine oxide photoinitiators having an ethylenically unsaturared polymerizable groups. The herein disclosed acylphosphine oxide photoinitiators may even be stored in UV transparent storage containers without danger for polymerization.

These and other advantages and benefits of the present invention will become apparent from the detailed description hereinafter.

DETAILED DESCRIPTION OF THE PREFERRED EMBODIMENTS

Definitions

The term "monofunctional polymerizable compound" means that the polymerizable compound includes one polymerizable group.

The term "polyfunctional polymerizable compound" means that the polymerizable compound includes two or more polymerizable groups.

The term 'thiol' is a sulfhydryl group (—SH).

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group.

Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —$NO_2$.

Inkjet Inks

In a preferred embodiment of the invention, a UV curable inkjet ink comprises at least an acylphosphine oxide photoinitiator and a polymerizable compound, wherein the acylphosphine oxide photoinitiator includes one or more acyl groups substituted by a thiol.

Particularly preferred acylphosphine oxide photoinitiators will described in detail hereinafter.

The UV curable inkjet ink may be colourless. Such an inkjet ink may be used as a primer or a varnish. A primer is usually applied for improving adhesion of an image, while a varnish is usually applied for influencing the gloss or as a protective topcoat for the image. In a more preferred embodiment, the UV curable inkjet ink contains also one or more colorants, most preferably colour pigments. A plurality of these inkjet inks may also be combined into an inkjet ink set for providing multicolour images.

The organic colour pigment is preferably dispersed in the liquid vehicle of the inkjet ink by a polymeric dispersant. The UV curable inkjet ink may contain a dispersion synergist to improve the dispersion quality and stability of the ink. Preferably, at least the magenta ink contains a dispersion synergist. A mixture of dispersion synergists may be used to further improve dispersion stability.

For printing multi-colour images, the UV curable inkjet ink is part of a UV curable inkjet ink set. A preferred UV curable inkjet ink set for printing different colours contains at least one UV curable inkjet ink according to the invention. The UV curable inkjet ink set is preferably a UV curable CMYK or CRYK inkjet ink set. This UV curable inkjet ink set may also be extended with extra inks such as violet, green, blue, and/or orange to further enlarge the colour gamut of the image. The UV curable inkjet ink set may also be extended by the combination of full density inkjet inks with light density inkjet inks. The combination of dark and light colour inks and/or black and grey inks improves the image quality by a lowered graininess.

The curable inkjet ink set may also include a colourless UV curable inkjet ink, such as a varnish or a primer. A varnish is used to enhance the glossiness of inkjet printed colour images. A primer can be used to improve the adhesion on difficult substrates like glass and polypropylene.

The UV curable inkjet ink set preferably also includes a UV curable white inkjet ink. The UV curable white inkjet ink preferably contains an inorganic white pigment such as a titanium dioxide, more preferably a rutile pigment, having an average particle size larger than 180 nm.

White inkjet inks are generally used for so-called "surface printing" or "backing printing" to form a reflection image on a transparent substrate. In surface printing, a white background is formed on a transparent substrate using a white ink and further thereon, a colour image is printed, where after the formed final image is viewed from the printed face. In so-called backing printing, a colour image is printed on a transparent substrate using colour inks and then a white ink is applied onto the colour inks, and the colour image is observed through the transparent substrate. In a preferred embodiment the UV curable colour inkjet ink is jetted on at least partially cured white inkjet ink. If the white ink is only partially cured, an improved wettability of the colour inkjet ink on the white ink layer is observed.

In a preferred embodiment, the UV curable inkjet ink contains an organic colour pigment in an amount of 6.0 to 13.0 wt % based on the total weight of the UV curable inkjet ink, and has a viscosity of at least 16.0 mPa·s at 45° C. and a shear rate of 10 $s^{-1}$. In a more preferred embodiment, a UV curable inkjet ink set is composed of at least three UV curable inkjet inks containing an organic colour pigment in an amount of 6.0 to 13.0 wt % based on the total weight of the UV curable inkjet ink, and each having a viscosity of at least 16.0 mPa·s at 45° C. and a shear rate of 10 $s^{-1}$.

The UV curable inkjet ink is preferably a so-called 100% solids UV curable inkjet ink. This means that no solvents, i.e. water or organic solvents, are present. However sometimes a small amount, generally less than 1 or 2 wt % of water based on the total weight of the inkjet ink, can be present. This water was not intentionally added but came into the inkjet ink via other components as a contamination, such as for example hydrophilic monomer.

The UV curable inkjet ink preferably does not contain an organic solvent. But sometimes it can be advantageous to incorporate a small amount of an organic solvent to improve adhesion to the surface of a substrate after UV-curing. In this case, the added solvent can be any amount in the range that does not cause problems of solvent resistance and VOC. The UV curable inkjet ink preferably contains 0 to 10 wt %, more preferably no more than 5.0 wt % of an organic solvent based on the total weight of the UV curable inkjet ink.

A single polymerizable compound may be used for the polymerizable composition of the UV curable inkjet ink, but usually a mixture of different polymerizable compounds to tune the ink properties, such as the adhesion to a set of substrates of the flexibility.

In one preferred embodiment of the UV curable inkjet ink, the polymerizable compound includes one or more acrylate groups. These polymerizable compounds allow for very fast curing in many industrial applications.

In another preferred embodiment of the UV curable inkjet ink, the polymerizable compound includes one or more polymerizable groups selected from the group consisting of an acrylamide, a methacrylamide, a vinyl ether group, a vinyl ester group, an allyl ether group, an allyl ester group, a vinyl carbonate group and an alkyne group. These polymerizable compounds are preferred for inkjet applications where skin irritation may represent an issue.

For further enhancing the UV LED curability, the UV curable inkjet ink preferably contains also thioxanthone, more preferably a polymerizable or polymeric thioxanthone photoinitiator. By using the latter diffusion hindered thioxanthone photoinitiators, UV curable inkjet inks for food packaging can be designed. In the latter case, preferably the polymerizable compound includes a multifunctional hybrid monomer containing two or more different polymerizable groups per molecule, such as, for example both an acrylate group and a vinyl ether group. An especially useful monomer is 2-(2-vinyloxyethoxy)ethyl acrylate (VEEA), although other hybrid monomers such as those described in U.S. Pat. No. 6,310,115 (AGFA) and US 2003199655 (NIPPON CATALYTIC CHEM) would also be suitable. Preferably, the UV curable inkjet inks comprise more than 25 wt %; and more preferably more than 30 wt % % of one or more hybrid multifunctional monomers, based on the total weight of polymerizable compounds.

For having a good ejecting ability, the viscosity of the UV curable inkjet ink at the jetting temperature is preferably smaller than 50.0 mPa·s, more preferably smaller than 30.0 mPa·s at a shear rate of $10\ s^{-1}$ and a jetting temperature between 30 and 70° C.

The surface tension of the UV curable inkjet ink is preferably in the range of 20 mN/m to 30 mN/m at 25° C., more preferably in the range of about 22 mN/m to about 25 mN/m at 25° C. In these ranges, good ink spreading is obtained on a wide range of substrates.

The UV curable inkjet ink may further also contain at least one inhibitor or stabilizer for improving the thermal stability of the ink.

The UV curable inkjet ink may further also contain at least one surfactant for obtaining good spreading characteristics on a substrate.

The UV curable inkjet ink is preferably a free radical curable inkjet ink. It was found that cationically curable inkjet inks posed problems of jetting reliability due to UV stray light. UV stray light hitting the nozzle plate of an inkjet print head results into failing nozzles due to clogging by cured ink in the nozzle. Unlike free radical curable ink where radical species have a much shorter lifetime, a cationic curable ink continues to cure once an acid species has been generated by UV light in the nozzle.

Acylphosphineoxide Photoinitiators

The acylphosphine oxide photoinitiator of the invention includes one or more acyl groups substituted by a thiol.

A preferred acylphosphine oxide photoinitiator has a chemical structure according to Formula (I):

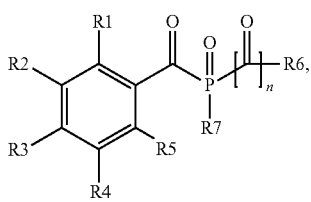

Formula (I)

wherein, n represents an integer having a value of 0 or 1; R2 is selected from the group consisting of hydrogen, an alkyl group, an alkoxy group, a group according to Formula (I-a), a —NH—C(=O)—R26 group, a —NH—C(=O)—O—R27 group and a —NH—C(=O)—NH—R28 group; R26 to R28 are independently selected from the group consisting of an alkyl group, an aryl group, an alkenyl group, an alkynyl group, an alkaryl group, an aralkyl group and an heteroaryl group; R1, R3, R4 and R5 are independently selected from the group consisting of hydrogen, an alkyl group, an alkoxy group and a group according to Formula (I-a); with the proviso that at least one of the selected R1 to R5 is a group substituted by a thiol or a group according to Formula (I-a) denoted by:

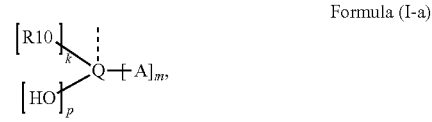

Formula (I-a)

wherein, Q is a z-valent linking group containing 6 to 30 carbon atoms with z=k+p+m and z<6, k=1 to z-p-m; p=0 to 2; and m=1 to 5;

A is a group according to Formula (I-b):

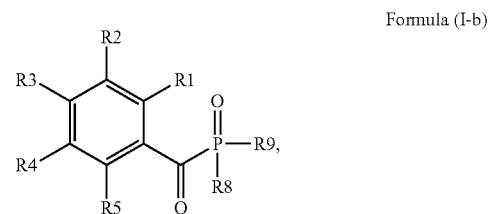

Formula (I-b)

wherein

R1 to R5 have the same meaning as for Formula (I), with the proviso that Q is coupled to the aromatic ring of A in any one of the positions occupied by R1 to R5; R8 and R9 are independently selected from the group consisting of a substituted or unsubstituted alkyl group, a substituted or unsubstituted aryl group, a substituted or unsubstituted alkoxy group, and a substituted or unsubstituted aryloxy group; R10 represents an alkyl group substituted by a thiol or an aryl group substituted by a thiol; R6 is selected from a substituted or unsubstituted alkyl group, a substituted or unsubstituted aryl group, a substituted or unsubstituted alkoxy group, and an aryloxy group if n=0; and if n=1 then R6 represents an alkyl group substituted by a thiol or an aryl group substituted by a thiol; R7 is selected from the group consisting of a substituted or unsubstituted alkyl group, a substituted or unsubstituted aryl group, a substituted or unsubstituted alkoxy group, a substituted or unsubstituted aryloxy group, and a group according to Formula (I-c):

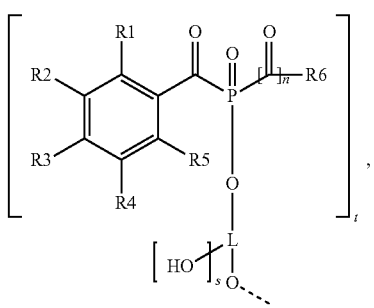

Formula (I-c)

wherein R1 to R6 and n have the same meaning as for Formula (I); s is an integer having a value of 0 to 4; t is an integer having a value of 1 to 5; u=s+t+1; and L represents an u-valent linking group having 2 to 16 carbon atoms.

In a preferred embodiment E1 of the acylphosphine oxide photoinitiator, the at least one of the selected R1 to R5 groups substituted by a thiol is R3.

In a preferred embodiment E2 of the acylphosphine oxide photoinitiator, R1 and R5 represent methyl.

In a preferred embodiment E3 of the acylphosphine oxide photoinitiator, R2 and R4 represent hydrogen.

In a preferred embodiment E4, R6 represents phenyl.

In a preferred embodiment E5, R7 represents an ethoxy group or phenyl.

In a preferred embodiment E6, R8 represents an ethoxy group or phenyl.

In a preferred embodiment E7, R9 represents phenyl.

In a preferred embodiment E8, L represents —CH$_2$—CH$_2$—.

Any one of the preferred embodiments E1 to E8 may be combined with one or more of the other embodiments E1 to E8. For example, a more preferred embodiment is a combination of the embodiments E2 and E3 E4, wherein R1 and R5 represent methyl and R2 and R4 represent hydrogen.

In a preferred embodiment the acylphosphine oxide photoinitiator comprises at least two thiol functions. In a further preferred embodiment said thiol is a thiol functionalized five or six membered heteroaromatic ring.

A particularly preferred acylphosphine oxide photoinitiator according to Formula (I) is a compound wherein one or more of the groups R5 to R10, R6 and R10 that are substituted by a thiol are represented by Formula (II):

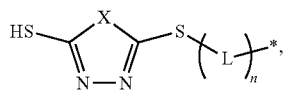

Formula (II)

wherein * represents the point of attachment; X is selected from the group consisting of O, S and NR11;
L represents a divalent linking group comprising no more than 15 carbon atoms; n represents 0 or 1; R11 is selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, a substituted or unsubstituted aryl or heteroaryl group and NR12R13; R12 and R13 are independently selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, a substituted or unsubstituted aryl or heteroaryl group and an acyl group. In a particularly preferred embodiment of the acylphosphine oxide photoinitiator, X represents S.

A particularly preferred acylphosphine oxide photoinitiator according to Formula (I) is a compound wherein one of the groups R3, R4, R5 to R10, R6 and R10 that are substituted by a thiol are represented by Formula (III):

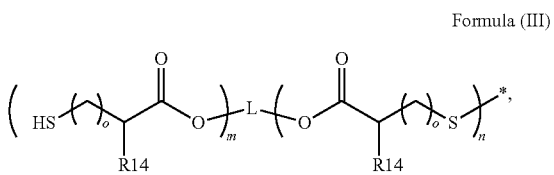

Formula (III)

wherein * represents the point of attachment; o represents an integer selected from 0 and 1; m and n independently represent an integer selected from 1 to 5; L represents an n+m-valent linking group comprising no more then 15 carbon atoms; R14 is selected from the group consisting of hydrogen and a substituted or unsubstituted alkyl group. In a particularly preferred embodiment, R14 is selected from the group consisting of hydrogen and a methyl group; n and m are represented by an integer selected from 1 to 3; and L represents a tri- or tetravalent linking group.

A combination of the groups containing a thiol according to Formula (II) and (III) may be used in one and the same acylphosphine oxide photoinitiator.

In another preferred embodiment, the acylphosphine oxide photoinitiator is a compound according to Formula (IV):

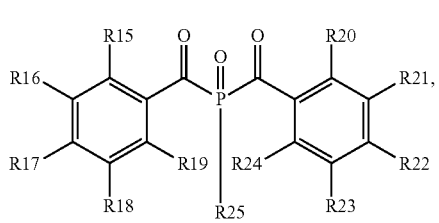

Formula (IV)

wherein
R16 and R21 are independently selected from the group consisting of hydrogen, a substituted or unsubstituted alkyl group, a substituted or unsubstituted alkoxy group, a group according to Formula (I-a), a —NH—C(=O)—R26 group, a —NH—C(=O)—O—R27 group and a —NH—C(=)O—NH—R28 group;
R26 to R28 are independently selected from the group consisting of an optionally substituted alkyl group, an optionally substituted aryl group, an optionally substituted alkenyl group, an optionally substituted alkynyl group, an optionally substituted alkaryl group, an optionally substituted aralkyl group and an optionally substituted heteroaryl group;
R15, R17 to R20 and R22 to R24 are independently selected from the group consisting of hydrogen, a substituted or unsubstituted alkyl group, a substituted or unsubstituted alkoxy group, with the proviso that at least one of R15 to R24 is a group substituted by a thiol; and R25 is selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group, a substituted or unsubstituted aryl or heteroaryl group, a substituted or unsubstituted alkoxy group and a substituted or unsubstituted aryloxy group. In a more preferred embodiment, at least one of R15 to R19 is a group substituted by a thiol and at least one of R20 to R24 is a group substituted by a thiol. The group substituted by a thiol is most preferably a group according to Formula (II) or a group according to Formula (III).

Preferred examples of acylphosphine oxide photoinitiators are disclosed in Table 1.

TABLE 1

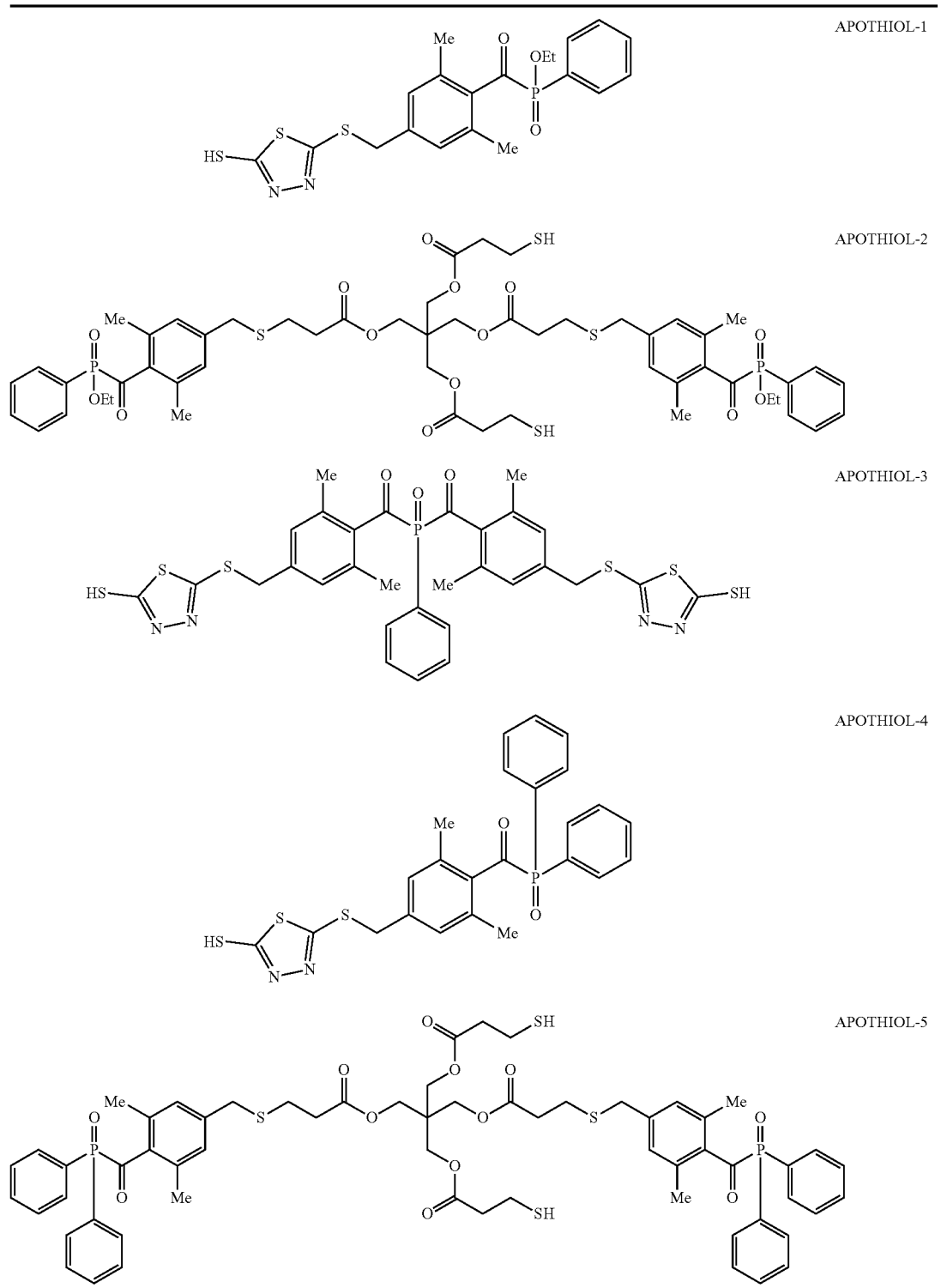

TABLE 1-continued
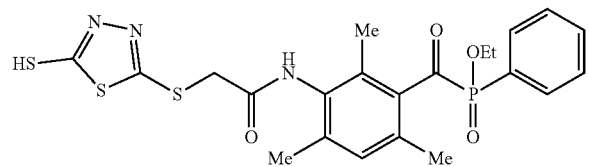 [SMILES: CCOP(=O)(C(=O)c1c(C)cc(C)c(NC(=O)CSc2nnc(S)s2)c1C)c1ccccc1]
APOTHIOL-6
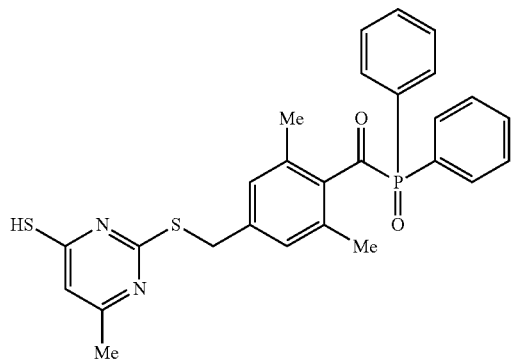 [SMILES: Cc1cc(S)nc(SCc2cc(C)c(C(=O)P(=O)(c3ccccc3)c3ccccc3)c(C)c2)n1]
APOTHIOL-7
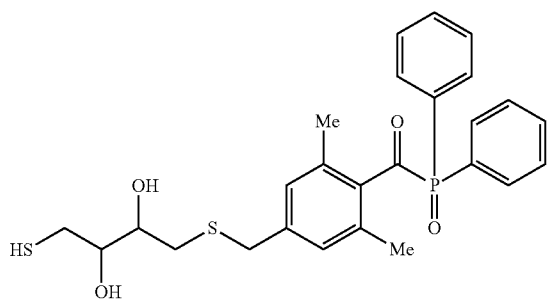 [SMILES: Cc1cc(CSCC(O)C(O)CS)cc(C)c1C(=O)P(=O)(c1ccccc1)c1ccccc1]
APOTHIOL-8
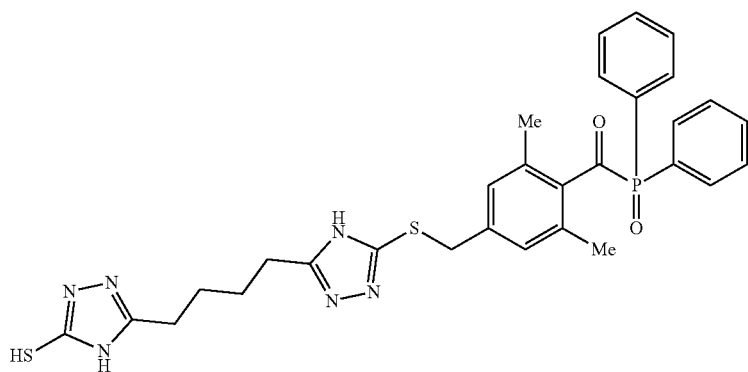 [SMILES: Cc1cc(CSc2nnc(CCCCc3nnc(S)[nH]3)[nH]2)cc(C)c1C(=O)P(=O)(c1ccccc1)c1ccccc1]
APOTHIOL-9
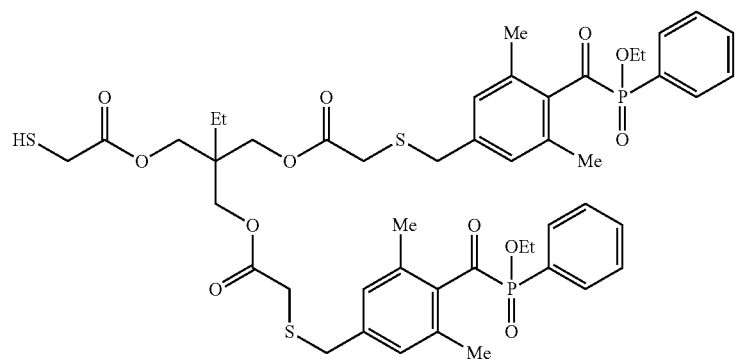 [SMILES: CCOP(=O)(C(=O)c1c(C)cc(CSCC(=O)OCC(CC)(COC(=O)CS)COC(=O)CSCc2cc(C)c(C(=O)P(=O)(OCC)c3ccccc3)c(C)c2)cc1C)c1ccccc1]
APOTHIOL-10

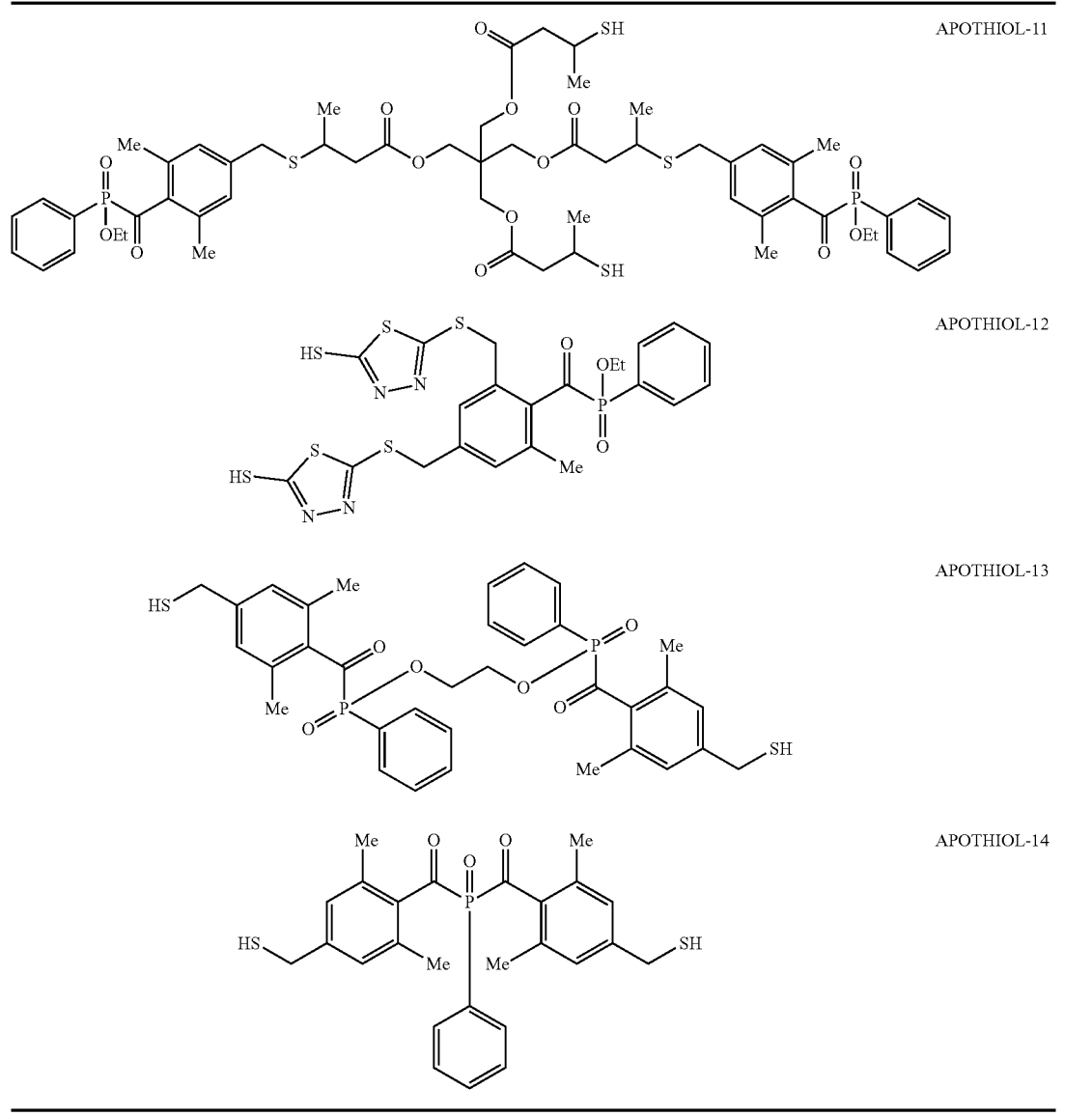

The synthesis of the acylphosphine oxide photoinitiators in accordance with the invention is not self-evident for the skilled person as the manner whereby a thiol function can be introduced on an acyl group of the acylphosphine oxide photoinitiator is not straightforward. However, a number of different synthesis pathways will now be disclosed which enable the skilled person to include thiol functions on the acyl group of acylphosphine oxide photoinitiators.

A first synthesis pathway can be represented by the following scheme:

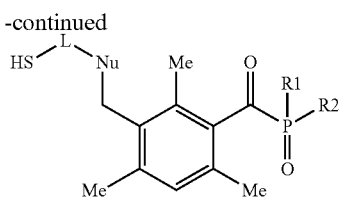

wherein the compound HS-L-Nu represents a thiol functionalized nucleophile, with L denoting a divalent linking group between the thiol and the nucleophilic functional group and Nu denoting a nucleophilic group. Additional information for such a reaction scheme can be found for similar reactions in e.g. Stewart, F.H.C, Organic Preparations and Procedures International 13(2), 116-118 (1981); and in Moszner et al., Beilstein Journal of Organic Chemistry 26 (DOI:10.3762/bjoc.6.26).

A second synthesis pathway for the preparation of acyl phosphine oxide photoinitiators according to the present invention is given by the following scheme:

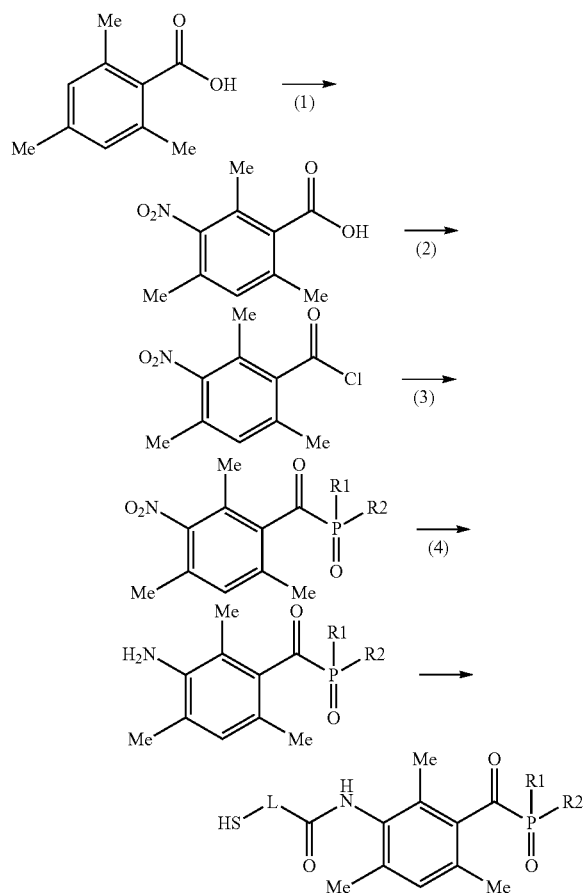

wherein L represents a divalent linking group between an amide and the thiol. Additional information for such a reaction scheme can be found for similar reactions in e.g. U.S. Pat. No. 6,420,567 (TEXAS BIOTECHNOLOGY) and WO 2004/078114 (ENCYSIVE PHARMACEUTICALS).

A third synthesis pathway for the preparation of acyl phosphine oxide type of photoinitiators according to the present invention is given by the following scheme:

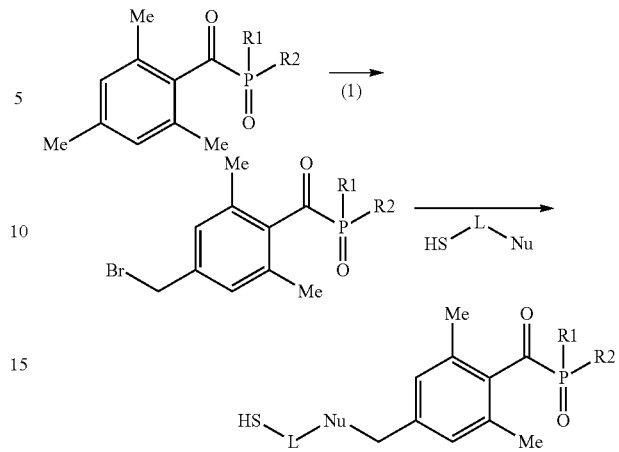

where in HS-L-Nu represents a thiol functionalized nucleophile, with L denoting a divalent linking group between the thiol and the nucleophilic functional group and Nu denoting a nucleophilic group. Additional information for such a reaction scheme can be found for similar reactions in e.g. US 2015197651 (FUJIFILM) and US 2015344711 (FUJIFILM).

More details can be found in synthesis examples hereinafter.

Other Photoinitiators

In addition to one or more acylphosphine oxide photoinitiators as described above, the UV curable inkjet ink may contain one or more other free radical photoinitiators. A free radical photoinitiator is a chemical compound that initiates polymerization of monomers and oligomers when exposed to actinic radiation by the formation of a free radical.

Two types of free radical photoinitiators can be distinguished. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

In order to increase the photosensitivity further, the UV curable inkjet ink may additionally contain co-initiators. Suitable examples of co-initiators can be categorized in three groups:

(1) tertiary aliphatic amines such as methyldiethanolamine, dimethylethanolamine, triethanolamine, triethylamine and N-methylmorpholine;

(2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; and (3) (meth)acrylated amines such as dialkylamino alkyl (meth)acrylates (e.g., diethylaminoethylacrylate) or N-morpholinoalkyl-(meth)acrylates (e.g., N-morpholinoethylacrylate).

The preferred co-initiators are aminobenzoates.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4, 4-trimethylpentylphosphine oxide, 2,4, 6trimethylbenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

In a particularly preferred embodiment of the UV curable inkjet ink, the one or more photoinitiators include a thioxanthone photoinitiator. Such a combination allows for fast UV curing with UV LEDS emitting above 370 nm.

In a preferred embodiment, at least one of the one or more other photoinitiators is selected from the group consisting of a polymeric photoinitiator, a polymerizable photoinitiator and a photoinitiator containing a plurality of photoinitiating groups, more preferably selected from the group consisting of a polymeric photoinitiator and a polymerizable photoinitiator. Such a diffusion hindered photoinitiator exhibits a much lower mobility in a cured layer of the UV curable inkjet ink than a low molecular weight monofunctional photoinitiator, such as benzophenone. Including diffusion hindered photoinitiators, and also diffusion hindered co-initiators do not only have a safety advantage for the operator of the inkjet printer, but are also environmentally friendly as these compounds cannot be leached out e.g. from an outdoor billboard by acid rain.

Most preferably the diffusion hindered photoinitiator is a polymerizable photoinitiator, preferably having at least one acrylate group, more preferably at least two or three acrylate groups. And most preferably the diffusion hindered co-initiator is a polymerizable co-initiator, preferably having at least one acrylate group.

Suitable diffusion hindered photoinitiators may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A (AGFA GRAPHICS) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2065362 A (AGFA) and EP 2161264 A (AGFA), incorporated herein by reference.

In a particularly preferred embodiment of the UV curable inkjet ink, the acylphosphine oxide photoinitiator of the invention is combined with a polymeric or polymerizable thioxanthone photoinitiator. Such a combination allows for both the safety advantage, e.g. food packaging, and the fast UV curing with UV LEDS emitting above 370 nm.

A preferred amount of the acyl phosphine oxide photoinitiator and the one or more other photoinitiators, if any, is an amount up to 50 wt %, more preferably 0.1-20 wt %, and most preferably 0.3-15 wt % of the total weight of the UV curable inkjet ink.

Preferred diffusion hindered co-initiators are the polymerizable co-initiators disclosed in EP 2053101 A (AGFA GRAPHICS) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 (AGFA) incorporated herein as a specific reference.

The UV curable inkjet ink preferably comprises a co-initiator in an amount of 0.1 to 50 wt %, more preferably in an amount of 0.5 to 25 wt %, most preferably in an amount of 1 to 10 wt % of the total weight of the UV curable inkjet ink.

Polymerizable Compounds

Any polymerizable compound commonly known in the art may be employed. The polymerizable compound may be any monomer and/or oligomer found in the Polymer Handbook Vol 1+2, 4th edition, edited by J. BRANDRUP et al., Wiley-Interscience, 1999. An oligomer in the present invention is understood to contain 2 to 8 repeating monomeric units.

Preferably a monomer or oligomer capable of free radical polymerization is used as polymerizable compound. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the radiation curable compositions and inks can be adjusted by varying the ratio between the monomers and oligomers.

Preferred monomers and oligomers are those listed in [0106] to [0115] in EP 1911814 A (AGFA).

A monofunctional polymerizable compound is generally used for enhancing the flexibility of a cured layer, whereas a polyfunctional polymerizable compound is used for enhancing scratch resistance of the cured layer.

A monofunctional polymerizable compound contains a single polymerizable group, preferably a free radical polymerizable group selected from the group consisting of an acrylate, a methacrylate, an acrylamide, a methacrylamide, a styrene group, a maleate, a fumarate, an itaconate, a vinyl ether, a vinyl ester, an allyl ether and an allyl ester.

In a preferred embodiment, the monofunctional polymerizable compounds are selected from acrylic acid, methacrylic acid, maleic acid (or there salts), maleic anhydride, alkyl(meth)acrylates (linear, branched and cycloalkyl) such as methyl(meth)acrylate, n-butyl(meth)acrylate, tert-butyl (meth)acrylate, cyclohexyl(meth)acrylate, and 2-ethylhexyl (meth)acrylate; aryl(meth)acrylates such as benzyl(meth) acrylate, and phenyl(meth)acrylate; hydroxyalkyl(meth) acrylates such as hydroxyethyl(meth)acrylate, and hydroxypropyl(meth)acrylate; (meth)acrylates with other types of functionalities (e.g. oxiranes, amino, fluoro, polyethylene oxide, phosphate substituted) such as glycidyl (meth)acrylate, dimethylaminoethyl(meth)acrylate, trifluoroethyl acrylate, methoxypolyethyleneglycol (meth)acrylate, and tripropyleneglycol (meth)acrylate phosphate; allyl derivatives such as allyl glycidyl ether; styrenics such as styrene, 4-methylstyrene, 4-hydroxystyrene, 4-acetostyrene, and styrenesulfonic acid; (meth)acrylonitrile; (meth)acrylamides (including N-mono and N,N-disubstituted) such as N-benzyl (meth)acrylamide; maleimides such as N-phenyl maleimide; vinyl derivatives such as vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate. In a more preferred embodiment, the monofunctional polymerizable compounds are selected from monoacrylates and vinyllactams, such as N-vinylcaprolactam. Particularly preferred monofunctional polymerizable compounds are selected from the group consisting of isoamyl acrylate, stearyl acrylate, lauryl acrylate, octyl acrylate, decyl acrylate, isoamyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloyxyethylphthalic acid, 2-acryloxyethyl-2-hydroxyethyl-phthalic acid, lactone modified flexible acrylate, t-butylcyclohexyl acrylate, caprolactone acrylate, cyclic trimethylolpropane formal acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and acryloylmorpholine In a preferred embodiment, the monofunctional polymerizable compound is selected from monoacrylates and vinyllactams, such as N-vinylcaprolactam.

The N-vinyllactam is preferably a compound represented by Formula (I):

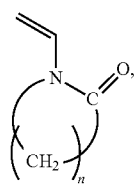

Formula (I)

wherein n denotes an integer of 2 to 6; n is preferably an integer of 3 to 5 from the viewpoint of flexibility after the ink composition is cured, adhesion to a substrate, and ready availability of starting materials, n is more preferably 3 or 5, and n is particularly preferably 5, which is N-vinylcaprolactam. N-vinylcaprolactam is preferable since it is readily available at a relatively low price, and gives particularly good ink curability and adhesion of a cured film to a recording medium.

The N-vinyllactam may have a substituent such as an alkyl group or an aryl group on the lactam ring, and may have a saturated or unsaturated ring structure bonded to the lactam ring. The compound represented by Formula (a) may be used singly or in a combination of two or more compounds.

For certain applications preferably no monofunctional (meth)acrylates are employed. For example, when the substrate is a textile that is worn directly on the human skin it may give rise to skin sensitization. In such a case, the monomers and oligomers are preferably selected from a group comprising or consisting of vinyls, acrylamides, methacrylamides, vinyl carbonates, vinyl ethers, vinyl esters, vinyl carbamates, allyl ethers, allyl esters and their corresponding alkyne compounds. Particularly preferred are polymerizable compounds including an allyl ether group, vinyl carbonate group and alkyne group.

A polyfunctional polymerizable compound contains two, three or more polymerizable groups, preferably free radical polymerizable groups selected from the group consisting of an acrylate, a methacrylate, an acrylamide, a methacrylamide, a styrene group, a maleate, a fumarate, an itaconate, a vinyl ether, a vinyl ester, an allyl ether and an allyl ester.

In a preferred embodiment, the polyfunctional polymerizable compound is a duofunctional acrylate containing two polymerizable groups, namely two acrylate groups.

Preferred polyfunctional acrylates include triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethyloltricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerythritol tetraacrylate, pentaerythritolethoxy tetraacrylate, dipentaerythritol hexaacrylate, ditrimethylolpropane tetraacrylate, glycerolpropoxy triacrylate, and caprolactam modified dipentaerythritol hexaacrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other polyfunctional acrylates include propoxylated glycerine triacrylate and propoxylated trimethylolpropane triacrylate, di-trimethylolpropane tetraacrylate, dipentaerythritol pentaacrylate, ethoxylated pentaerythritol tetraacrylate, methoxylated glycol acrylates and acrylate esters.

Preferred polyfunctional acrylates include dipropylene glycol diacrylate, tripropylene glycol diacrylate, 1,6-hexanediol diacrylate, cyclohexanone dimethanol diacrylate, polyethyleneglycol 200 diacrylate, 3-methyl 1,5-pentanediol diacrylate, pentaerythritol tetraacrylate, trimethylolpropane triacrylate and dipentaerythritol pentaacrylate.

The polyfunctional polymerizable compound may have two different polymerizable groups, such as a vinylether group and an acrylate group. Preferred vinylether acrylates are those disclosed in U.S. Pat. No. 6,310,115 (AGFA). A particularly preferred compound is 2-(2'-vinyloxyethoxy) ethyl acrylate (VEEA). Other suitable vinylether acrylates are those disclosed in columns 3 and 4 of U.S. 67/679,890 B (NIPPON SHOKUBAI).

Instead of difunctional or polyfunctional acrylates, also their methacrylate analogues may be used.

For certain applications preferably no polyfunctional (meth)acrylates are employed. For example, when the substrate is a textile that is worn directly on the human skin it may give rise to skin sensitization.

A preferred alternative free radical curing chemistry is the so-called thiol-ene and thiol-yne chemistry. In such a chemistry, a combination of at least one polyfunctional thiol compound and at least one polyfunctional polymerizable compound is used. The polyfunctional polymerizable compound is a polyfunctional monomers or oligomer having a plurality of polymerizable groups selected from a group consisting of a vinyl group, an acrylamide group, a methacrylamide group, a vinyl carbonate group, a vinyl ether group, a vinyl ester group, a vinyl carbamate group, an allyl ether groups, an allyl ester group and an alkyne group. Particularly preferred are polymerizable compounds including allyl ether groups, vinyl carbonate groups and alkyne groups.

Synthesis of such monomers is disclosed in the relevant literature, for example in HURD, Charles D. Vinylation and the Formation of Acylals. *Journal Am. Chem. Soc.* 1956, vol. 78, no. 1, p. 104_106; LOBELL, M., et al. Synthesis of hydroxycarboxylic acid vinyl esters. *MP Synthesis.* 1994, vol. 4, p. 375-377; LEE, T. Y., et al. Synthesis, Initiation, and Polymerization of Photoinitiating Monomer. *Macromolecules.* 2005, vol. 38, no. 18, p. 7529-7531; ATTA, A. M., et al. New vinyl ester resins based on rosin for coating applications. *React. Funct. Polym.* 2006, vol. 66, p. 1596-1608; WO 01/00634 A (WRIGHT CHEM CORP); and ROHR, Markus, et al. Solvent-free ruthenium-catalysed vinylcarbamate synthesis from phenylacetylene and diethylamine in 'supercritical' carbon dioxide. Green Chemistry. 2001, vol. 3, p. 123-125.

Preferred polymerizable oligomers and polymers are urethanes, polyesters, polyethers, polycarbonates, poly-carbamates, polyureas and straight-chain oligomers having the following polymerizable groups: acrylate, methacrylate, vinyl, acrylamide, methacrylamide, vinyl carbonate, vinyl ether, vinylester-vinyl carbamate groups, as well as their corresponding alkyne compounds.

Particularly preferred monomers are selected from the group consisting of di- or oligofunctional allylethers, di- or oligofunctional allyl esters, di- or oligofunctional vinyl ethers, di- or oligofunctional vinyl esters and di- or oligofunctional norbornene derivatives. Typical allyl ethers can be selected from pentaerythritol tetraallyl ether, glycerol triallyl ether, 1,6-hexane diol diallyl ether, cyclohexane dimethanol diallyl ether, trimethylolpropane triallyl ether, dipentaerythritol hexaallyl ether and ethoxylated and propoxylated derivatives thereof. Typical vinylethers can be selected from pentaerythritol tetravinyl ether, glycerol trivinyl ether, 1,6-hexane diol divinyl ether, cyclohexane dimethanol divinyl ether, trimethylolpropane trivinyl ether, dipentaerythritol hexavinyl ether and ethoxylated and propoxylated derivatives thereof. Typical allyl esters can be selected from adipic acid diallyl ester, terephtalic acid diallyl ester, trimellitic acid triallyl ester, pyromellitic acid tetraallyl ester, citric acid triallyl ester and glutaric acid diallyl ester. Typical vinyl esters can be selected from adipic acid divinyl ester, terephtalic acid divinyl ester, trimellitic acid trivinyl ester, pyromellitic acid tetravinyl ester, citric acid trivinyl ester and glutaric acid divinyl ester.

Thiol-yne chemistry has been described as an extension for thiol-ene chemistry to design cross-linked networks with a higher cross-linking density and glass transition temperature in comparison with thiol-ene based networks. The chemistry has recently been reviewed by Lowe et al. (Journal of Materials Chemistry, 20, 4745-4750 (2010)) and by Hoogenboom R. (Angew. Chem. Int. Ed. 49, 3415-3417 (2010)).

Optionally photochemically induced radical double addition of polyfunctional thiol compounds to di- or multifunctional alkynes is the basis of thiol-yne chemistry. In principle any di- or multifunctional alkyne, including polymeric alkynes, can be used in combination with any di- or polyfunctional thiol compound.

In a preferred embodiment, at least one of the alkyne functions in the di- or polyfunctional alkynes is represented by H—C≡C—*, where * represents the covalent bond to the rest of the di- or polyfunctional alkyne.

In a more preferred embodiment, all of the alkyne groups in the di- or polyfunctional alkyne are represented by H—C≡C—*.

In an even more preferred embodiment, the alkyne functions in said di- or polyfunctional alkyne is selected from the group consisting of a propargyl ether, a propargyl ester, a propargyl urethane, a propargyl ureum, a propargyl carbonate, a propargyl amide, a propargyl thioether and a propargyl amine. In a further preferred embodiment, said alkyne group is selected from the group consisting of a propargyl ether, a propargyl ester and propargyl urethane, a propargyl ester and a propargyl urethane being particularly preferred.

Preferred thiol compounds for conducting thiol-ene or thiol-yne chemistry are thiol molecules including at least two thiol groups. Preferred thiol molecules include two to six thiol groups, preferably three to five thiol groups, and most preferably four thiol groups.

The thiol molecule is preferably a compound comprising an aliphatic thiol.

In a preferred embodiment, the thiol molecule is represented by Formula (I):

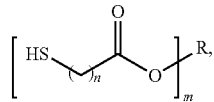

Formula (I)

wherein n represents an integer from 1 to 4; m represents an integer from 2 to 6; and R represents an m-valent linking group comprising at most 20 carbon atoms.

In a preferred embodiment n represents 1 or 2.

In a preferred embodiment m represents 3 or 4.

In a more preferred embodiment n represents 1 or 2 and m represents an integer from 2 to 6. In the most preferred embodiment n represents 1 or 2 and m represents 3 or 4.

In a preferred embodiment, the thiol compound has a molecular weight smaller than 1,000 Dalton, more preferably the thiol compound has a molecular weight smaller than 500 Dalton.

Particularly preferred primary thiol molecules include tetra(ethylene glycol) dithiol (CAS 2781-02-4), glycol di(3-mercaptopropionate) (CAS 22504-50-3), glyceryl dithioglycolate (CAS 63657-12-5), glycol dimercaptoacetate (CAS 123-81-9), trimethylolpropane trimercaptoacetate (CAS 10193-96-1), pentaerythritol tetramercaptoacetate (CAS 10193-99-4), glycol di(3-mercaptopropionate) (CAS 22504-50-3), trimethylolpropane tri(3-mercaptopropionate) (CAS 33007-83-9), pentaerythritol tetra(3-mercaptopropionate) (CAS 7575-23-7), dipentaerythritol hexa(3-mercaptopropionate) (CAS 25359-71-1), ethoxylated-trimethylolpropane tri-3-mercaptopropionate (CAS 345352-19-4), and tris[2-(3-mercaptopropionyloxy)ethyl]isocyanurate (CAS 36196-44-8).

The above and other thiol molecules are commercially available, e.g. as Thiocure™ grades from Bruno Bock Chemische Fabrik GmbH & Co. KG.

Suitable thiol molecules include 1,1,1-trimethylolpropane tris(3-mercaptopropyl)ether, 1,2,4-tris(2-mercaptoethyl)cyclohexane, tri(3-mercaptopropyl) trimetylolpropane and others disclosed by WO 2011/004255 A (KUROS BIOSURGERY).

It was found that thiol molecules having secondary thiol groups exhibited less odour than thiol molecules having only primary thiol groups. Hence, the thiol molecule preferably includes at least two secondary thiol groups, more preferably the thiol molecule includes two to six secondary thiol groups, preferably three to five secondary thiol groups, and most preferably four secondary thiol groups.

A particularly preferred thiol molecule having secondary thiol groups is pentaerythritol tetrakis (3-mercaptobutylate). The latter is available as Omnimer™ PE1 from IGM RESINS and Karenz MT™ PE1 from SHOWA DENKO.

For minimizing odour of the UV curable inkjet ink, especially after UV curing, the molar ratio of thiol molecules having primary thiol groups over thiol compounds having at least one secondary thiol group is preferably 0 to 4, more preferably the molar ratio is 0, meaning that the thiol molecules in the UV curable inkjet ink consist of thiol molecules containing at least one secondary thiol group. For calculating the molar ratio, a thiol molecule having primary thiol groups is considered to have only primary thiol groups, while thiol molecules containing at least one secondary thiol group may also include primary thiol groups.

In the most preferred embodiment, the thiol molecules consist of thiol molecules containing only secondary thiol groups.

For improving mechanical performance and limited potential for water uptake, leachables and degradation, the thiol molecules are preferably ester-free thiol molecules.

Particularly preferred ester-free thiol molecules are silane based thiol molecules and siloxane based thiol molecules. Such compounds can easily be synthesized by reacting thioacetic acid with functional alkenes to give thioester derivatives that can be hydrolyzed under alkaline or acidic conditions.

Suitable silane based thiol molecules and siloxane based thiol molecules are disclosed by WO 2011/004255 A (KUROS BIOSURGERY), especially those in the examples 1 to 6.

A preferred example of a silane based thiol molecule for use in the UV curable inkjet ink is tetra(3-mercaptopropyl)silane, which synthesis is described in Example 5 of WO 2011/004255 A (KUROS BIOSURGERY).

A preferred example of a siloxane based thiol molecule for use in the UV curable inkjet ink is 2,4,6,8-tetra(2-mercaptoethyl)-2,4,6,8-tetramethylcyclotetrasiloxane, which synthesis is described in Example 4 of WO 2011/004255 A (KUROS BIOSURGERY).

More preferably silane based thiol molecules and siloxane based thiol molecules including secondary thiol groups are used in the UV curable inkjet ink according to the invention. Such thiol molecules not only improve mechanical properties, but also reduce the odour problem.

A preferred example of a silane based thiol molecule containing secondary thiol groups is the compound represented by the formula TH-1:

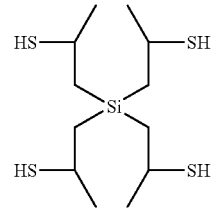

Formula TH-1

The synthesis of TH-1 may be performed in a multi-step reaction. In the first step, hydrogen bromide is reacted with tetraallylsilane to give tetrakis(2-bromopropyl)silane. The latter is converted with thiourea to its isothiouronium salt, which is then hydrolyzed with aqueous sodium hydroxide to give TH-1.

The thiol compound may also be a so-called thiol pigment. A thiol pigment is an inorganic pigment, such as a silica pigment or a titaniumdioxide pigment, which surface has been functionalized with two or more thiol groups. The main advantage is that UV curable inkjet inks containing a thiol pigment exhibit no or minor odour prior to UV curing, which is generally not the case for UV curable inkjet inks containing polyfunctional thiol molecules. The latter cause a bad odour even at small amounts of evaporated thiol molecules.

Silica nanoparticles are preferred because they are usually small-sized, monodisperse and can be easily surface-modified. A monodisperse distribution is advantageous for the transparency of printed colour inks, thus enlarging the colour gamut.

Thiol groups are preferably introduced on the surface using an alkoxysilane containing a thiol group. Typical examples of siloxanes containing a thiol are 3-mercapotopropyl triethoxysilane, 3-mercaptopropyl trimethoxysilane, 2-mercaptoethyl triethoxysilane, 4-mercaptobutyl triethoxysilane, 2-mercaptopropyl trimethoxysilane and 3-mercaptobutyl trimethoxysilane. A preferred alkoxysilane containing a thiol group is 3-mercaptopropyl trimethoxysilane (MPTMS).

An example of a suitable synthesis scheme for a thiol pigment is as follows: a dry phase deposition method was used to functionalize silica particles (e.g. Ludox™ TM-50 from GRACE having an average particle size of about 22 nm). The silica particles were dispersed in anhydrous ethanol (15 mL of ethanol per gram of silica) and MPTMS (available from ALDRICH) was added such that the ratio of the amount of silica (in g) to the amount of MPTMS (in mL) was 3:7. Ultra high purity grade nitrogen was bubbled through the mixture to evaporate the ethanol under fume hood, thus depositing MPTMS on the surface of the silica. For the silanization reaction, the silica was then placed in oven at 120° C. for 9 hours. The material was allowed to cool and washed twice with 50 mL of anhydrous ethanol to remove any physically adsorbed MPTMS and dried again in oven. The silica was analyzed using FTIR to verify the MPTMS deposition on the silica surface.

The number of thiol groups on the thiol pigment surface can be easily modified as desired as long as at least two thiol groups are present. However, usually a large number of thiol groups is present on the pigment surface, preferably more than ten thiol groups, more preferably even more than twenty or fifty thiol groups.

A commercially available thiol pigment having however a large average particle size of 2.2 µm is Aktisil™ MM mercapto modified from HOFMANN MINERAL. The average particle size of the thiol pigment as measured according to ISO 13320-1 is preferably between 10 nm and 1 µm, more preferably between 15 nm and 250 nm, and most preferably between 20 nm and 150 nm.

Due to its higher molecular weight per unit, it is not necessary to include secondary thiol groups for improvement of the odour. In fact preferably primary thiol groups are included because of their greater reactivity in thiol-ene and thiol-yne click chemistry.

Colorants

The UV curable inkjet ink may contain a colorant. Colorants used in the curable inks may be dyes, pigments or a combination thereof. Organic and/or inorganic pigments may be used.

An organic colour pigment includes in its chemical molecular structure carbon atoms, hydrogen atoms and at least one of sulphur atoms, oxygen atoms, nitrogen atoms, and selenium atoms. Carbon black and metal oxides, such as cobalt oxide or titanium dioxide are considered inorganic pigments. Organic colour pigments may however include a metal atom or ion, such as e.g. copper phthalocyanine pigments.

The pigments may be black, white, cyan, magenta, yellow, red, orange, violet, blue, green, brown, mixtures thereof, and the like. This colour pigment may be chosen from those disclosed by HERBST, Willy, et al. Industrial Organic Pigments, Production, Properties, Applications. 3rd edition. Wiley-VCH, 2004. ISBN 3527305769.

The organic colour pigment is preferably selected of the group consisting of may a cyan, magenta, yellow, red, orange, violet, blue, green, and brown, organic colour pigment. A colour pigment may be chosen from those disclosed by HERBST, Willy, et al. Industrial Organic Pigments, Production, Properties, Applications. 3rd edition. Wiley-VCH, 2004. ISBN 3527305769.

Suitable organic colour pigments are disclosed in paragraphs [0128] to [0138] of WO 2008/074548 (AGFA GRAPHICS).

In a preferred embodiment, the UV curable inkjet ink includes an organic colour pigment having the numbers below described in the Colour Index.

In a preferred embodiment, the UV curable inkjet ink is a UV curable yellow inkjet ink including an organic colour pigment selected from the group consisting of C.I Pigment Yellow 120, C.I Pigment Yellow 150, C.I Pigment Yellow 151, C.I Pigment Yellow 155 and C.I Pigment Yellow 180, more preferably selected from the group consisting of C.I Pigment Yellow 151 and C.I Pigment Yellow 155.

A preferred organic colour pigment for the UV curable cyan inkjet ink is C.I. Pigment Blue 15:4.

A preferred organic colour pigment for the UV curable magenta or red inkjet ink is a quinacridone pigment, a diketopyrrolopyrrole pigment or mixed crystals thereof.

Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may also be used in the UV curable inkjet ink.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. An average particle size smaller than 0.050 µm is less desirable for decreased light-fastness. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

The organic colour pigment in preferably present in an amount of 0.1 wt % to 18.0 wt %, more preferably 1.0 wt % to 10.0 wt %, and most preferably 3.0 wt % to 10.0 wt %, with the weight percentage (wt %) based on the total weight of the UV curable inkjet ink.

The UV curable inkjet ink set for printing different colours containing a plurality of UV curable inkjet inks includes preferably at least one black or grey UV curable inkjet ink. The UV curable black inkjet ink includes preferably a carbon black pigment, more preferably further also a R-copper phthalocyanine pigment having an average particle size smaller than 200 nm. By including a β-copper phthalocyanine pigment in the black inkjet ink, images can be printed having an appealing neutral black or grey colour instead of a brownish black or grey colour.

The UV curable inkjet ink set for printing different colours containing a plurality of UV curable inkjet inks preferably includes also a UV curable white inkjet ink.

Suitable white pigments are given by Table 2 in [0116] of WO 2008/074548 (AGFA GRAPHICS). The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548 (AGFA GRAPHICS).

The white pigment is preferably present in the range of 9 to 40 wt %, more preferably in the range of 12 to 35% by weight and most preferably in the range of 15 to 25% by weight, the weight percentage wt % based on the total weight of the inkjet ink. An amount of less than 9% by weight cannot achieve sufficient covering power and usually exhibits very poor storage stability and ejection property.

In the most preferred embodiment, the UV curable white inkjet ink preferably contains a titanium dioxide pigment having an average particle size larger than 180 nm. Titanium dioxide pigments with an average particle size above 180 nm have a strong opacifying capability compared to other inorganic white pigments, such as calcium carbonate having the same average particle size.

The average particle size of the inorganic pigments in the inkjet ink can be determined in the same manner as explained above for the organic colour pigments.

Polymeric Dispersants

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA) incorporated herein as a specific reference.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

- DISPERBYK™ dispersants available from BYK CHEMIE GMBH;
- SOLSPERSE™ dispersants available from NOVEON;
- TEGO™ DISPERS™ dispersants from EVONIK;
- EDAPLAN™ dispersants from MUNZING CHEMIE;
- ETHACRYL™ dispersants from LYONDELL;
- GANEX™ dispersants from ISP;
- DISPEX™ and EFKA™ dispersants from CIBA SPECIALTY CHEMICALS INC;
- DISPONER™ dispersants from DEUCHEM; and
- JONCRYL™ dispersants from JOHNSON POLYMER.

Particularly preferred polymeric dispersants include Solsperse™ dispersants from NOVEON, Efka™ dispersants from CIBA SPECIALTY CHEMICALS INC and Disperbyk™ dispersants from BYK CHEMIE GMBH. Particularly preferred dispersants are Solsperse™ 32000, 35000 and 39000 dispersants from NOVEON.

The polymeric dispersant is preferably used in an amount of 2 to 200 wt %, more preferably 10 to 120 wt %, most preferably 30 to 80 wt % based on the weight of the pigment.

Stabilizers

The UV curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

A preferred polymerization inhibitor is Irgastab™ UV10 from BASF.

In a preferred embodiment, the polymerization inhibitor is a mixture of different types of polymerization inhibitors. Preferred polymerization inhibitors are mixtures of an oxyl free radical-based polymerization inhibitor, a phenol-based polymerization inhibitor, and an amine-based polymerization inhibitor. Suitable examples are given in EP 2851402 A (FUJIFILM).

Since excessive addition of these polymerization inhibitors will lower the ink sensitivity to curing, it is preferred that the amount capable of preventing polymerization is determined prior to blending. The amount of a polymerization inhibitor is preferably lower than 2 wt % based on the total weight of the UV curable inkjet ink.

Surfactants

Surfactants may used in the UV curable inkjet ink for reducing the surface tension in order to improve the spreading of the inkjet ink. A UV curable inkjet ink must meet stringent performance criteria in order to be adequately jettable with high precision, reliability and during an extended period of time. The surface tension is not only determined by the amount and type of surfactant, but also by the polymerizable compounds and other additives in the ink composition.

The surfactant(s) can be anionic, cationic, non-ionic, or zwitter-ionic and are preferably added in a total quantity of no more than 2.0 wt %, preferably less than 1.0 wt % based on the total weight of the UV curable inkjet ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants include fluoro surfactants (such as fluorinated hydrocarbons) and silicone surfactants. The silicones are typically siloxanes and can be alkoxylated, polyether modified, polyester modified, polyether modified hydroxy functional, amine modified, epoxy modified and other modifications or combinations thereof. Preferred siloxanes are polymeric, for example polydimethylsiloxanes.

The fluorinated or silicone compound used as a surfactant may be a polymerizable surfactant. Suitable polymerizable compounds having surface-active effects include, for example, polyacrylate copolymers, silicone modified acrylates, silicone modified methacrylates, acrylated siloxanes, polyether modified acrylic modified siloxanes, fluorinated acrylates, and fluorinated methacrylate. These acrylates can be mono-, di-, tri- or higher functional (meth)acrylates.

Depending upon the application a surfactant can be used with a high, low or intermediate dynamic surface tension. Silicone surfactants are generally known to have low dynamic surface tensions while fluorinated surfactants are known to have higher dynamic surface tensions.

Silicone surfactants are preferred in the UV curable inkjet ink of the present invention, especially the reactive silicone surfactants, which are able to be polymerized together with the polymerizable compounds during the curing step.

Examples of useful commercial silicone surfactants are those supplied by BYK CHEMIE GMBH (including Byk™-302, 307, 310, 331, 333, 341, 345, 346, 347, 348, UV3500, UV3510 and UV3530), those supplied by TEGO CHEMIE SERVICE (including Tego Rad™ 2100, 2200N, 2250, 2300, 2500, 2600 and 2700), Ebecryl™ 1360 a polysilixone hexaacrylate from CYTEC INDUSTRIES BV and Efka™_3000 series (including Efka™-3232 and Efka™-3883) from EFKA CHEMICALS B.V.; and those supplied by MOMENTIVE PERFORMANCE MATERIALS, such as Coatasil™ 7500.

Preparation of Inkjet Inks

The preparation of pigmented UV curable inkjet inks is well-known to the skilled person. Preferred methods of preparation are disclosed in paragraphs [0076] to [0085] of WO 2011/069943 (AGFA).

Inkjet Printing Methods

A preferred inkjet printing method comprising the steps of: a) jetting a UV curable inkjet ink according to the invention on a substrate; and
b) at least partially UV curing the UV curable inkjet ink on the substrate with UV LEDs.

In a preferred embodiment, the UV curable inkjet ink is printed via a single pass printing operation.

In a preferred embodiment, the UV curable inkjet ink is cured by UV-LED radiation within 5 seconds of being printed.

In a preferred embodiment, the total UV-dose used to cure the UV curable inkjet inks is less than 300 mJ/cm$^2$.

The inkjet printing method results in a printed article. A preferred printed article includes a substrate and the UV curable inkjet ink as described above. The substrate is preferably selected from the group consisting of polyethylene terephthalate, aluminum, and glass.

Printing Devices

The UV curable inkjet ink is jetted by one or more print heads ejecting small droplets in a controlled manner through nozzles onto a substrate moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with inkjet ink or liquid. When the voltage is again removed, the ceramic expands to its original shape, ejecting a drop of ink from the print head.

A preferred piezoelectric print head is a so called push mode type piezoelectric print head, which has a rather large piezo-element capable of ejecting larger or high viscous inkjet ink droplets. Such a print head is available from RICOH as the GEN5s print head.

A preferred piezoelectric print head is a so-called through-flow piezoelectric drop-on-demand print head. Such a print head is available from TOSHIBA TEC as the CF1ou print head. By using a through-flow print head, the UV curable inkjet ink in the print head is constantly renewed which reduces sedimentation of pigment particles in the print head leading to a poor reliability in an industrial printing environment.

However the inkjet printing method according to the present invention is not restricted to piezoelectric inkjet printing. Other inkjet print heads can be used and include various types, such as a continuous type print head.

The inkjet print head normally scans back and forth in a transversal direction across the moving ink-receiver surface. Often the inkjet print head does not print on the way back. Bi-directional printing is preferred for obtaining a high areal throughput.

Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the ink-receiver surface is transported under the inkjet print heads.

In a particularly preferred embodiment, the inkjet printing of the UV curable inkjet ink is performed in a multi-pass printing mode. Multi-pass printing is a technique used to reduce banding in ink-jet printing. Dots of ink, when still in liquid form, tend to run together due to surface tension. This is referred to as coalescence. To print a high quality image it is important to print individual round dots. But to achieve full saturated colours, the dots must overlap to completely cover the paper. By only printing a portion of the image data so as to avoid simultaneously printing adjacent dots during each printing cycle, coalescence may be largely avoided. Additionally, by avoiding all horizontal adjacencies, the transverse speed of the printing mechanism can be increased up to two times the rated print speed of the print head. In a preferred embodiment, the number of passes used is to 2 to 6 passes, more preferably no more than 4 passes.

An advantage of using a multi-pass printing mode is that the UV curable inkjet ink is cured in consecutive passes, rather than in a single pass which would require a curing device with a high UV output. The print head lifetime is also larger for multi pass printing. While in single pass printing one side shooter is sufficient to replace the whole print head, in multi pass printing side shooters and even failings can be tolerated. Also the cost of a multi-pass printer is usually much lower, especially for wide format substrates.

Curing Devices

The UV curable inkjet ink according to the present invention is cured by ultraviolet radiation.

In inkjet printing, the UV curing device may be arranged in combination with the print head of the inkjet printer, travelling therewith so that the UV curable inkjet ink is exposed to curing radiation very shortly after been jetted.

In such an arrangement it can be difficult to provide a small enough UV radiation source connected to and travelling with the print head. Therefore, a static fixed radiation source may be employed, e.g. a source of curing UV-light, connected to the radiation source by means of flexible radiation conductive means such as a fibre optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

In a particularly preferred embodiment, the UV curing is performed using UV LEDs having an emission wavelength higher than 370 nm.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Substrates

There is no real limitation on the type of substrate for inkjet printing the UV curable inkjet ink of the invention on. The substrates may have ceramic, metallic, glass, wood, paper or polymeric surfaces for printing. The substrate may also be primed, e.g. by a white ink.

The substrate may be porous, as e.g. textile, paper and card board substrates, or substantially non-absorbing substrates such as e.g. a plastic substrate having a polyethylene terephthalate surface.

The substrate may also be pre-treated, e.g. by corona, plasma or flame treatment.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

There is no restriction on the shape of the substrate. It can be a flat sheet, such a paper sheet or a polymeric film or it can be a three dimensional object like e.g. a plastic coffee cup. The three dimensional object can also be a container like a bottle or a jerry-can for including e.g. oil, shampoo, insecticides, pesticides, solvents, paint thinner or other type of liquids.

In a preferred embodiment of the inkjet printing method, the substrate is selected from textile, glass, pharmaceutical and food packaging.

In a preferred embodiment of the inkjet printing method, the substrate is a rigid medium selected from rigid PVC, paperboard, corrugated and wood.

In a preferred embodiment of the inkjet printing method, the substrate is substrate suitable for soft signage applications, such as banners, posters, POP/POS displays, indoor wall graphics, tradeshow displays, parasols, flags, outdoor advertising and backdrops.

A major advantage of the current UV curable inkjet ink in textile inkjet printing is that not only a wide range of textiles can be printed upon, but also that the touch-and-feel is improved compared to standard UV curable inkjet inks. The reason is that the layer thickness obtained after printing the UV curable inkjet inks of the present invention is much smaller than with the standard UV curable inkjet inks.

Suitable textiles can be made from many materials. These materials come from four main sources: animal (e.g. wool, silk), plant (e.g. cotton, flax, jute), mineral (e.g. asbestos, glass fibre), and synthetic (e.g. nylon, polyester, acrylic). Depending on the type of material, it can be woven or non-woven textile.

The textile substrate is preferably selected from the group consisting of cotton textiles, silk textiles, flax textiles, jute textiles, hemp textiles, modal textiles, bamboo fibre textiles, pineapple fibre textiles, basalt fibre textiles, ramie textiles, polyester based textiles, acrylic based textiles, glass fibre textiles, aramid fibre textiles, polyurethane textiles (e.g. Spandex or Lycra™), Tyvek™ and mixtures thereof.

Suitable polyester textile includes polyethylene terephthalate textile, cation dyeable polyester textile, acetate textile, diacetate textile, triacetate textile, polylactic acid textile and the like.

Applications of these textiles include automotive textiles, canvas, banners, flags, interior decoration, clothing, hats, shoes, floor mats, doormats, brushes, mattresses, mattress covers, linings, sacking, stage curtains, flame-retardant and protective fabrics, and the like. Polyester fibre is used in all types of clothing, either alone or blended with fibres such as cotton. Aramid fibre (e.g. Twaron) is used for flame-retardant clothing, cut-protection, and armour. Acrylic is a fibre used to imitate wools.

The UV curable inkjet inks of the invention are also very suitable for inkjet printing on leather, especially on natural leather.

EXAMPLES

Materials

All materials used in the examples were readily available from standard sources such as Sigma-Aldrich (Belgium) and Acros (Belgium) unless otherwise specified.

WAKO V59 is 2,2-azobis(2-methylbutyronitrile) supplied by WAKO CHEMICALS GmbH.

DIPEA is diisopropylethyl amine.

TPO-L is ethyl phenyl(2,4,6-trimethylbenzoyl)phosphinate, commercial as Omnirad TPO-L, supplied by IGM Resins BV.

THIOXANTHON-1 is a polymerizable thioxanthone, having the following structure and being a 50 w % solution in VEEA. THIOXANTHON-1 can be prepared according to example 1 in EP 2684876 A (AGFA):

persons. Depending on the smell a score from 0 for completely odourless to 5 for a penetrating smell was given. The scores were then averaged. For example, score of 1, 0 and 1 were averaged to 0.66.

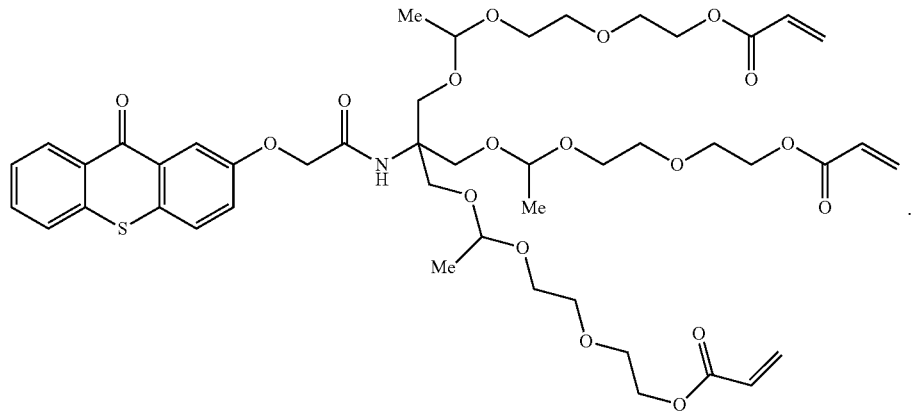 [SMILES: C=CC(=O)OCCOCCOC(C)OCC(COC(C)OCCOCCOC(=O)C=C)(COC(C)OCCOCCOC(=O)C=C)NC(=O)COc1ccc2sc3ccccc3c(=O)c2c1]

GENOPOL AB1 is a polymeric 4-dimethylaminobenzoic acid derivative supplied by Rahn.

VEEA is 2-(2'-vinylethoxy)ethyl acrylate available from NIPPON SHOKUBAI, Japan.

INHIB is a mixture forming a polymerization inhibitor having a composition according to Table 2

TABLE 2

| Component | wt % |
| --- | --- |
| VEEA | 82.4 |
| p-methoxyphenol | 4.0 |
| BHT | 10.0 |
| Cupferron™ AL | 3.6 |

Cupferron™ AL is aluminum N-nitrosophenylhydroxylamine from WAKO CHEMICALS LTD.

PET foil is a 175 μm thick clear polyethylene terephthalate substrate available as X175.332 from AGFA-GEVAERT.

Measurement Methods

1. Molecular Mass Determination by TLC-MS

The molecular mass was determined using TLC-MS, according to the following procedure. A TLC was run under circumstances given in the synthetic examples. The TLC was analyzed using a CAMAG™ TLC-MS interface coupled to an AmaZon™ SL mass spectrometer (supplied by Bruker Daltonics) via an Agilent™ 1100 HPLC pump. First a blank spectrum was taken by eluting a spot on the TLC plate where no compounds are present with a 0.01 molar solution of ammonium acetate in methanol. A second spectrum of the compound to be analyzed was taken by eluting the spot of the compound under consideration with a 0.01 molar solution of ammonium acetate in methanol. The first spectrum was subtracted from the second spectrum, giving the spectrum of the compound to be analyzed.

2. Smell of UV Cured Samples

The smell of a cured sample on a PET foil was evaluated according to the following procedure. The samples were covered with an extra PET foil on top of the cured layer to avoid evaporation of volatile components generated during curing. The smell of each cured coating was judged by three 3. Viscosity The viscosity was measured using a Rheometer™ ARG2 from TA INSTRUMENTS.

Example 1

This example illustrates the synthesis of APOTHIOL-4.

Reaction Scheme

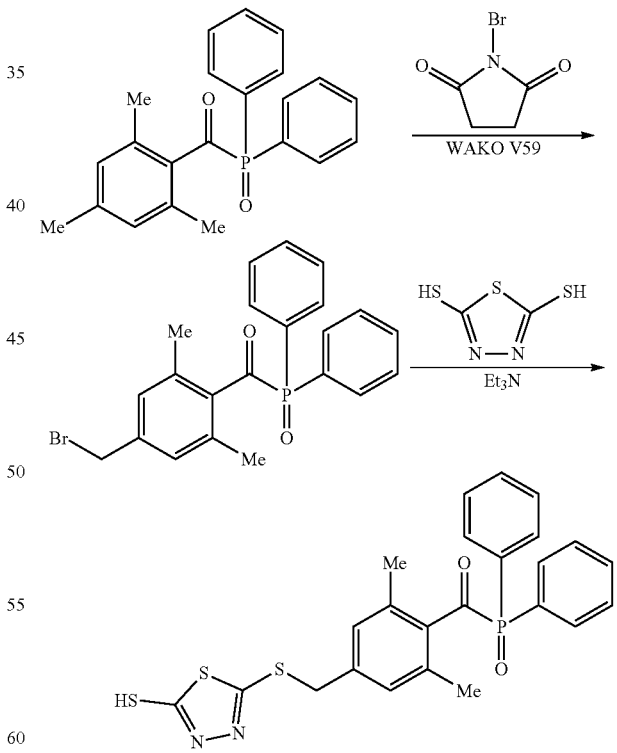

Step 1: formation of (4-bromomethyl-2,6-dimethylphenyl)-(diphenyl-phosphinoyl)-methanone 10 g (28.7 mmol) (2,4,6-trimethylbenzoyl)diphenylphosphine oxide was dissolved in 100 ml chlorobenzene. 5.11 g (28.7 mmol)N-bromo-succinimid was added and the mixture was heated to 80° C. 0.23 g (1.2 mmol) WAKO V59 was added and the reaction was allowed to continue at 80° C. for 18 hours. The reaction mixture was allowed to cool down to room temperature. 150 ml ethyl acetate was added and the mixture was extracted twice with a mixture of 100 ml water and 50 ml brine. The organic fraction was dried over $MgSO_4$ and evaporated under reduced pressure. (4-bromomethyl-2,6-dimethyl-phenyl)-(diphenyl-phosphinoyl)-methanone was purified using preparative column chromatography on a Prochrom™ LC80 column, using Kromasil™ Si60A 10 μm as stationary phase and hexane/ethyl acetate 50/50 as eluent. 2.8 g of (4-bromomethyl-2,6-dimethyl-phenyl)-(diphenyl-phosphinoyl)-methanone was isolated (TLC analysis on TLC Silica gel $60F_{254}$ supplied by Merck, eluent hexane/ethyl acetate 60/40:$R_f$:0.27). The molecular mass was confirmed using the TLC-MS methodology described above.

Step 2: Formation of APOTHIOL-4

2.8 g (6.6 mmol) (4-bromomethyl-2,6-dimethyl-phenyl)-(diphenyl-phosphinoyl)-methanone was dissolved in 150 ml ethyl acetate. 0.67 g (6.6 mmol) triethyl amine and 1 g (6.6 mmol) 2,5-dimercapto-[1,3,4]-thiadiazole were added and the mixture was heated to 40° C. The reaction was allowed to continue for four hours at 40° C. and at room temperature for an additional 16 hours. The reaction mixture was extracted with 25 ml water, followed by an extraction with a mixture of 25 ml water and 10 ml brine. The ethyl acetate fraction was dried over $MgSO_4$ and evaporated under reduced pressure. APOTHIOL-4 was purified using preparative column chromatography on a Prochrom™ LC80 column, using Kromasil™ Si60A 10 μm as stationary phase and methylene chloride/ethyl acetate 60/40 as eluent. (TLC analysis on TLC Silica gel $60F_{254}$ supplied by Merck, eluent methylene chloride/hexane 60/40:$R_f$:0.35). The molecular mass was confirmed using the TLC-MS methodology described above.

Example 2

This example illustrates the synthesis of APOTHIOL-6.
Reaction Scheme

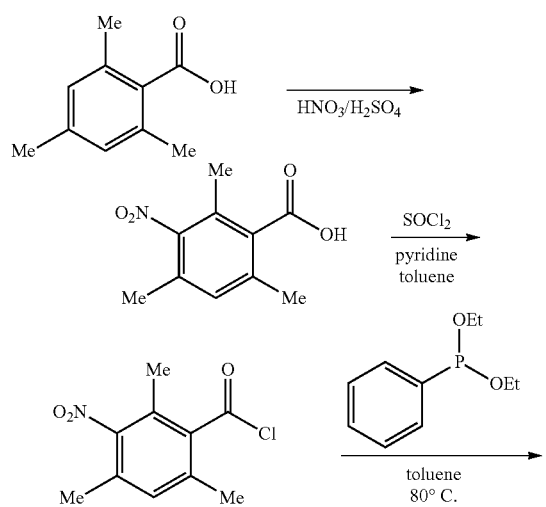

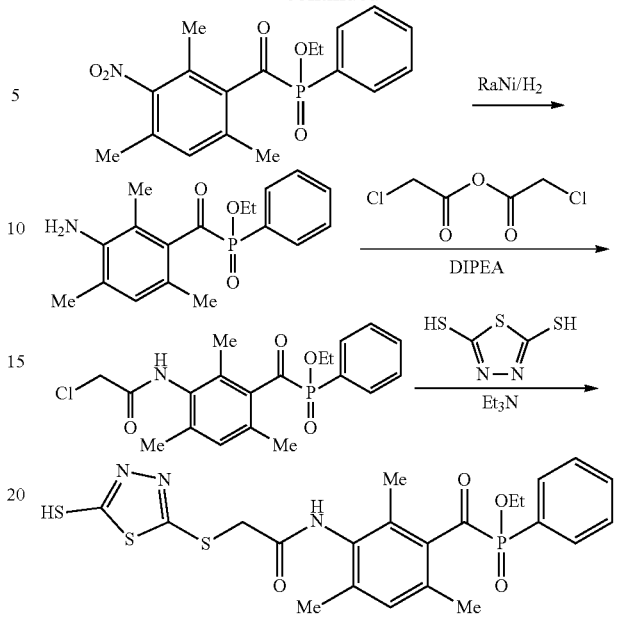

Step 1: formation of 3-nitro-2,4,6-trimethyl Benzoic Acid 50 g (0.3 mol) 2,4,6-trimethyl benzoic acid was suspended in 1390 g of a 65% solution of nitric acid. The mixture was stirred and 98.57 g sulphuric acid was added. The temperature rose to 40° C. The reaction was allowed to continue for 16 hours at room temperature. The mixture was slowly poured into 1500 g of an ice-water mixture. 3-nitro-2,4,6-trimethyl benzoic acid precipitated from the medium, was isolated by filtration and dried. 58.2 g (y:92.7%) of 3-nitro-2,4,6-trimethyl benzoic acid was isolated (m.p. 196° C.). 3-nitro-2,4,6-trimethyl benzoic acid was used without further purification.

Step 2: Formation of 3-nitro-2,4,5-trimethyl Benzoyl Chloride 15.69 g (75 mmol) 3-nitro-2,4,6-trimethyl benzoic acid was suspended in 150 ml toluene. 8.89 g (0.1125 mol) pyridine was added and the mixture was stirred for 10 minutes. 13.83 g (0.1125 mol) thionyl chloride was added over 15 minutes. The reaction was allowed to continue for 30 minutes at room temperature. The precipitated salts were removed by filtration and washed with 25 ml toluene. The pooled toluene fractions were evaporated under reduced pressure. The residue was treated with 200 ml methyl t.butyl ether and the solvent was evaporated again under reduced pressure. 13 g of 3-nitro-2,4,6-trimethyl benzoyl chloride was isolated and used without purification.

Step 3: Formation of (3-nitro-2,4,6-trimethyl-benzoyl)-phenyl-phosphinic Acid Ethyl Ester 4.3 g (22 mmol) diethyl phenylphosphinate was dissolved in 75 ml toluene and the mixture was heated to 80° C. A solution of 5 g (22 mmol) 3-nitro-2,4,5-trimethyl benzoyl chloride in 25 ml toluene was added over 15 minutes. The reaction was allowed to continue for 2 hours at 80° C. The reaction mixture was allowed to cool down to room temperature, extracted with 250 ml of a saturated $NaHCO_3$-solution, extracted twice with a saturated NaCl solution, dried over MgSO₄ and evaporated under reduced pressure. (3-nitro-2,4,6-trimethyl-benzoyl)-phenyl-phosphinic acid ethyl ester was purified using preparative column chromatography on a Grace™ resolve RS80 column, using methylene chloride as eluent. 1.7 g of (3-nitro-2,4,6-trimethyl-benzoyl)-phenyl-phosphinic acid ethyl ester was isolated (TLC analysis on TLC Silica gel 60F$_{254}$ supplied by Merck, eluent methylene chloride/ethyl acetate 90/10:R$_f$:0.49). The molecular mass was confirmed using the TLC-MS methodology described above.

Step 4: Formation of (3-amino-2,4,6-trimethyl-benzoyl)-phenyl-phosphinic Acid Ethyl Ester 3.6 g (10 mmol) of (3-nitro-2,4,6-trimethyl-benzoyl)-phenyl-phosphinic acid ethyl ester was dissolved in 40 ml methanol. (3-nitro-2,4,6-trimethyl-benzoyl)-phenyl-phosphinic acid ethyl ester was hydrogenated at 30° C. using RaNi as catalyst. After three and a half hours, the reduction was complete. The catalyst was removed by filtration and the solvent was removed under reduced pressure. 3.2 g (y:96%) of (3-amino-2,4,6-trimethyl-benzoyl)-phenyl-phosphinic acid ethyl ester was isolated and used without purification. (3-amino-2,4,6-trimethyl-benzoyl)-phenyl-phosphinic acid ethyl ester was analyzed using the TLC-MS methodology as disclosed above (TLC analysis on a Reveleris™ RP C18 TLC plate, supplied by Grace, eluent methanol/0.5 M sodium chloride 80/20, R$_f$:0.67).

Step 5: Formation of [3-(2-Chloro-acetylamino)-2,4,6-trimethyl-benzoyl]-phenyl-phosphinic Acid Ethyl Ester 3.0 g (9 mmol) (3-amino-2,4,6-trimethyl-benzoyl)-phenyl-phosphinic acid ethyl ester and 1.2 g (9 mmol) DIPEA were dissolved in 30 ml ethyl acetate. A solution of 1.5 g (9 mmol) 2-chloro-acetic anhydride in 7.5 ml ethyl acetate was added. The reaction was allowed to continue for one hour at room temperature and an additional 16 hours at 50° C. The reaction mixture was allowed to cool down to 35° C. and a solution of 2.3 g (13.5 mmol) 2-chloro-acetic anhydride and 1.8 g (13.9 mmol) DIPEA in 7.5 ml ethyl acetate was added.

The reaction was allowed to continue for an additional 16 hours at 55° C. The reaction mixture was allowed to cool down to room temperature. The mixture was extracted twice with 50 ml water, dried over MgSO₄ and evaporated under reduced pressure. [3-(2-Chloro-acetylamino)-2,4,6-trimethyl-benzoyl]-phenyl-phosphinic acid ethyl ester was purified using preparative column chromatography on a Prochrom™ LC80 column, using Kromasil™ C18 100 Å 10 μm as stationary phase and methanol/0.2 M NH₄OOAc 70/30 as eluent. 1.22 g [3-(2-Chloro-acetylamino)-2,4,6-trimethyl-benzoyl]-phenyl-phosphinic acid ethyl ester was isolated. [3-(2-Chloro-acetylamino)-2,4,6-trimethyl-benzoyl]-phenyl-phosphinic acid ethyl ester was analyzed using TLC analysis on a Reveleris™ RP C18 TLC plate, supplied by Grace, eluent methanol/1 M sodium chloride 70/30 (R$_f$:0.49). The molecular mass was confirmed using the TLC-MS methodology described above.

Step 6: Formation of APOTHIO-6

1.22 g (3 mmol) [3-(2-Chloro-acetylamino)-2,4,6-trimethyl-benzoyl]-phenyl-phosphinic acid ethyl ester was dissolved in 75 ml ethyl acetate. 0.3 g (3 mmol) triethyl amine and 0.45 g (3 mmol) 2,5-dimercapto-[1,3,4]-thiadiazole were added and the mixture was heated to 50° C. The reaction was allowed to cool down to room temperature. The precipitated salts were removed by filtration. The mixture was extracted twice with a mixture of 10 ml water and 10 ml of a saturated NaCl solution, dried over MgSO₄ and evaporated under reduced pressure. APOTHIO-6 was purified using preparative column chromatography on a Graceresolve™ RS80 column, using a gradient elution from methylene chloride to methylene chloride/ethyl acetate 50/50. 0.6 g of APOTHIO-6 was isolated (TLC analysis a RP-18 F$_{254}$ TLC plate supplied by Merck, eluent methanol/1 M sodium chloride, R$_f$:0.28). The molecular mass was confirmed using the TLC-MS methodology described above.

Example 3

This example illustrates the synthesis of APOTHIOL-2. Reaction Scheme

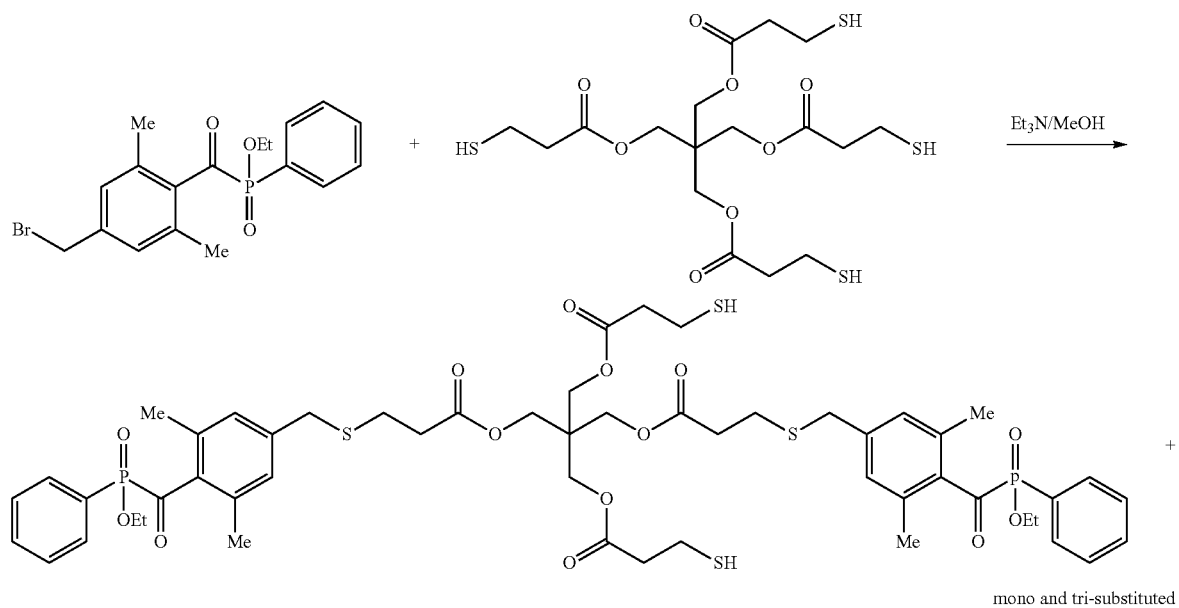

mono and tri-substituted 0.98 g (2 mmol) pentaerythritol tetrakis(3-mercaptopropionate) was dissolved in 40 ml methanol. 0.45 g (4.4 mmol) triethyl amine and 1.58 g (4 mmol) (4-bromomethyl-2,6-dimethyl-benzoyl)-phenyl-phosphinic acid ethyl ester were added and the reaction was allowed to continue for 48 hours at room temperature. The solvent was removed under reduced pressure and the residue was dissolved in 50 ml ethyl acetate. The precipitated salts were removed by filtration and the ethyl acetate fraction was extracted with 30 ma of a 0.1 M HCl solution and 20 ml brine. The organic fraction was dried over MgSO₄ and evaporated under reduced pressure. 1.9 g of a mixture of thiol functionalized acyl phosphine oxide photoinitiators was isolated. The mixture of thiol functionalized acyl phosphine oxide initiators was analyzed using LC-MS.

The LC-MS analysis was performed on a YMC Aq column (50×2 mm, particle size 3 μm) in combination with an AmaZon™ SL mass spectrometer (Bruker Daltonics), using ESI as ionization method. A gradient elution according to the scheme in Table 3 was used at a flow rate of 0.5 ml/min and a temperature of 40° C. Fluent A:water/methanol 9/1 containing 10 mmol ammonium acetate. Fluent B:methanol with 10 mmol ammonium acetate. 5 μl of a solution of 2.6 mg of APOTHIOL-2 in 20 ml methanol was injected.

TABLE 3

| Time (min) | % B |
|---|---|
| 0 | 0 |
| 8 | 100 |
| 15 | 100 |

APOTHIOL-2 was found to be a mixture of the following compounds as shown by Table 4.

TABLE 4

| Structure | Retention time (min) |
|---|---|
| 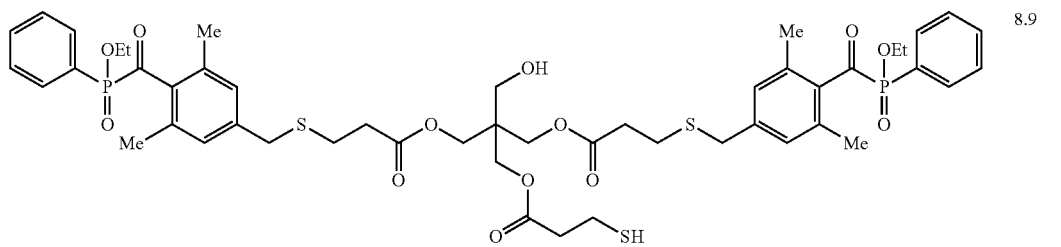 | 8.9 |
| 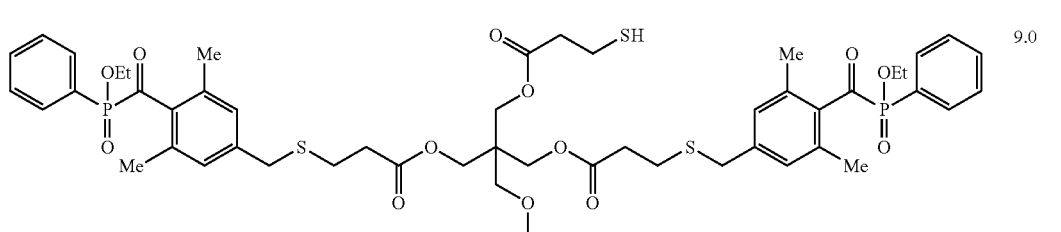 | 9.0 |
| 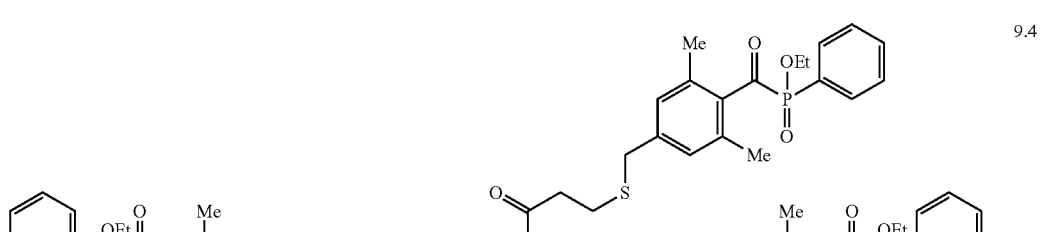 | 9.4 |

A small amount of the following compound was formed as contaminant during synthesis or sample preparation (retention time: 7.9 min):

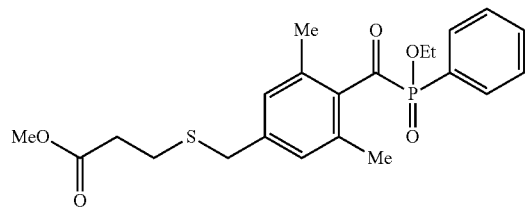

Such a contaminant can be easily removed by known purification methods.

Example 4

This example illustrates the synthesis of APOTHIOL-1.
Reaction Scheme

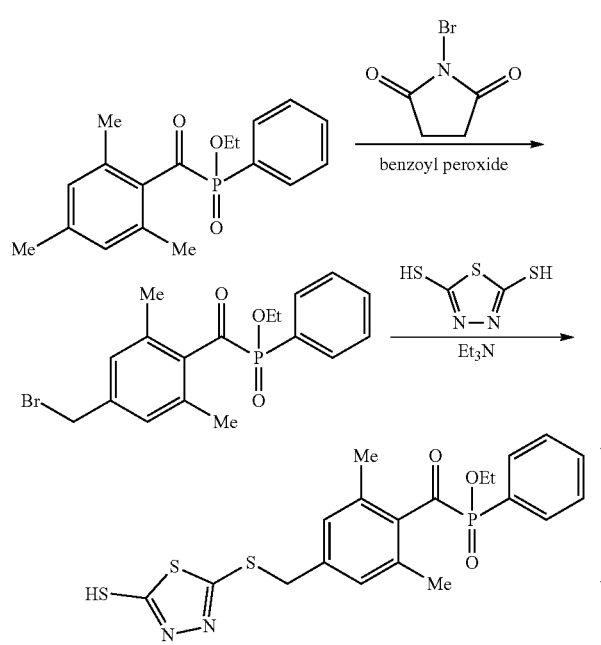

Step 1: Bromination of 2,4,6-trimethylbenzoylethoxyphenylphosphine oxide: the Synthesis of (4-bromomethyl-2,6-dimethyl-benzoyl)-phenyl-phosphinic Acid Ethyl Ester 119.57 g (0.378 mol) 2,4,6-trimethylbenzoylethoxyphenylphosphine oxide was dissolved in 500 ml acetonitrile. 67.28 g (0.378 mol)N-bromo-succinimid and 7.84 g (0.0324 mol) benzoyl peroxide were added and the mixture was heated to reflux. The mixture was refluxed for three hours. The mixture was allowed to cool down to room temperature and the solvent was removed under reduced pressure. The crude mixture was dissolved in 3600 ml methylene chloride and pre-purified on a Grace™ resolve RS80 column using a gradient elution from methylene chloride to methylene chloride/ethyl acetate 93/7 to remove non eluting residues. 60 g of the crude 4-bromomethyl-2,6-dimethylbenzoylethoxyphenylphosphine oxide was isolated. 4-bromomethyl-2,6-dimethylbenzoylethoxyphenylphosphine oxide was purified by preparative chromatography on a Prochrom™ LC 80 column, using Kromasil™ 60 Å 10 µm as stationary phase and hexane-methyl tert.butyl ether (50/50) as eluent. 21.26 g 4-bromomethyl-2,6-dimethylbenzoylethoxyphenylphosphine oxide was isolated (TLC analysis on Reveleris™ RP C18-plates, supplied by Grace, eluent hexane-methyl tert. butyl ether (50/50), $R_f$:0.17)).

$^1$H NMR analysis on a Varian™ 400 MHz Inova+ spectrometer, using CDCl$_3$ as solvent and TMS as reference revealed that the isolated compound was an isomeric mixture of the following compounds

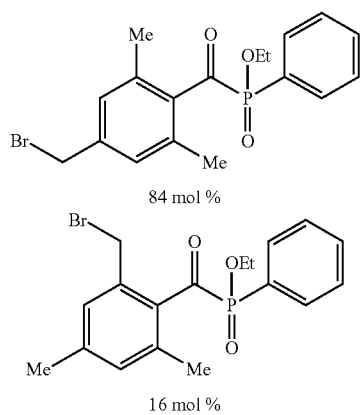

84 mol %

16 mol %

Step 2: Nucleophilic Substitution of (4-bromomethyl-2,6-dimethyl-benzoyl)-phenyl-phosphinic Acid Ethyl Ester by 2,5-dimercapto-1,3,4-thiadiazole 0.902 g (6 mmol) 2,5-dimercapto-1,3,4-thiadiazole was added to 25 ml methanol. 0.606 g (6 mmol) triethyl amine was added and the mixture was stirred for 10 minutes until a yellow solution was obtained. 1.97 g (5 mmol) of (4-bromomethyl-2,6-dimethyl-benzoyl)-phenyl-phosphinic acid ethyl ester was added and the mixture was stirred for 3 hours at room temperature. A small residue was removed by filtration and the solvent was removed under reduced pressure. The crude [4-(5-mercapto-[1,3,4]thiadiazol-2-ylsulfanylmethyl)-2,6-dimethyl-benzoyl]-phenyl-phosphinic acid ethyl ester was purified by preparative column chromatography on a Prochrom™ LC80 column, using Kromasil™ C18 100 Å silica and methanol/0.2 M ammonium acetate 70/30 as eluent. The isolated fractions were pooled and methanol was removed under reduced pressure. The pH was adjusted to 3.5 and the aqueous solution was extracted with 100 ml methylene chloride. The methylene chloride fraction was dried over MgSO$_4$ and evaporated under reduced pressure. 0.41 g (17%) of [4-(5-mercapto-[1,3,4]thiadiazol-2-ylsulfanylmethyl)-2,6-dimethyl-benzoyl]-phenyl-phosphinic acid ethyl ester was isolated (TLC analysis on Reveleris™ RP C18-plates, supplied by Grace, eluent MeOH/1M NaCl 70/30:0.37).

Example 5

This example illustrates the reduced extractability of thiol functionalized acylphosphine oxide type of photoinitiators and the improved smell of a cured layer therewith.

Preparation of UV Curable Inkjet Inks

The UV curable inkjet inks INV-1 and COMP-1 were prepared according to Table 5. The weight % (wt %) was based on the total weight of the radiation curable composition.

TABLE 5

| w % of component | INV-1 | COMP-1 |
|---|---|---|
| APOTHIOL-1 | 8.2 | — |
| TPO-L | — | 7.0 |
| THIOXANTHON-1 | 16.4 | 20.0 |
| GENOPOL AB1 | 8.2 | 10.0 |
| VEEA | 48.4 | 62.0 |
| INHIB | 0.82 | 1.0 |
| Ethanol | 17.8 | — |

The UV curable inkjet ink INV-1 was coated on a PET foil using a bar coater and a 12 μm wired bar. The UV curable inkjet ink COMP-1 was coated on a PET foil using a bar coater and a 10 μm wired bar. Both coated samples SINV-1 and SCOMP-1 from the UV curable inkjet inks INV-1 respectively COMP-1 were cured using a Fusion DRSE-120 conveyer, equipped with a Fusion VPS/1600 lamp (D-bulb). The samples SINV-1 and SCOMP-1 were cured three times at a belt speed of 20 m/min at full power of the lamp.

Results and Evaluation

Two samples of 7.068 $cm^2$ of SINV-1 and SCOMP-1 were put into a 50 ml beaker and extracted with 4.5 ml acetonitrile, using ultrasound for 30 minutes. The extract was transferred into a 5 ml volumetric flask. The samples were rinsed twice with a small amount of acetonitrile and the rinsing solvent was transferred into the 5 ml volumetric flask until the volume was adjusted to 5 ml. The solution was thoroughly mixed and filtered over a 0.45 μm filter. 3 μl of each sample was injected on the HPLC. Reference solutions of APOTHIOL-1 and 2,4,6-trimethylbenzoylethoxyphenyl phosphine oxide with a known concentration in acetonitrile were prepared and analysed using the same HPLC-method to allow quantitative determination of APOTHIOL-1 and 2,4,6-trimethylbenzoyl-ethoxyphenylphosphine oxide in the extracts. The following HPLC method was used. An Alltima™ C18 column (150×3.2, 5 μm C18 silica), supplied by ALLTECH was used. The analysis was done at 40° C. using a gradient elution given by Table 6. Eluent A was water, while Eluent B was acetonitrile. A flow of 0.5 ml/min was used in combination with a UV-VIS detector at 204 nm.

TABLE 6

| Time (min) | % A |
|---|---|
| 0 | 55 |
| 6 | 55 |
| 30 | 0 |
| 50 | 0 |
| 51 | 55 |
| 58 | 55 |

The extractable amounts of acyl phosphine oxide and its degradation products are given by Table 7.

The smell of each sample was evaluated. The averaged score of the three persons judging the smell is given in Table 7.

TABLE 7

| Sample | Extractable amount of acylphosphine oxide (mg/m²) | Smell |
|---|---|---|
| SCOMP-1 | 100 | 2 |
| SINV-1 | <5 | 0.66 |

From Table 7, it becomes apparent that thiol functionalized acylphosphine oxide type of photoinitiators are almost completely coupled to the polymeric network while non functionalized acylphosphine oxides remain migrateable to a considerable extent. In SCOMP-1 a residual smell of mesitaldehyde was clearly observed, while in SINV-1 hardly any background smell was noticeable.

Example 6

This example illustrates the reduced extractability of thiol functionalized acylphosphine oxide type of photoinitiators and the improved smell of a cured layer therewith.

Preparation of UV Curable Inkjet Inks

The UV curable inkjet inks INV-2 and COMP-2 were prepared according to Table 8. The weight % (wt %) was based on the total weight of the radiation curable composition.

TABLE 8

| wt % of component | INV-2 | COMP-2 |
|---|---|---|
| APOTHIOL-6 | 11 | — |
| TPO-L | — | 7 |
| THIOXANTHON-1 | 20 | 20 |
| GENOPOL AB1 | 10 | 10 |
| VEEA | 58 | 62 |
| INHIB | 1 | 1 |

The inventive UV curable inkjet ink INV-2 and the comparative UV curable inkjet ink COMP-1 were coated on a PET foil using a bar coater and a 10 μm wired bar to deliver samples SINV-2 respectively SCOMP-2. Both coated samples were cured using a Fusion DRSE-120 conveyer, equipped with a Fusion VPS/1600 lamp (D-bulb). The samples SINV-2 and SCOMP-2 were cured three times at a belt speed of 20 m/min at full power of the lamp. Both samples were fully cured.

Results and Evaluation

Two samples SINV-2 and SCOMP-2 were evaluated for the amount of migrateables that could be extracted. A sample of 7.068 $cm^2$ of was put into a 50 ml beaker and extracted with 4.5 ml acetonitrile, using ultrasound for 30 minutes. The extract was transferred into a 5 ml volumetric flask. The sample was rinsed twice with a small amount of acetonitrile and the rinsing solvent was transferred into the 5 ml volumetric flask until the volume was adjusted to 5 ml. The solution was thoroughly mixed and filtered over a 0.45 μm filter. 5 μl of each sample was injected on the HPLC.

The following HPLC method was used. An Alltima C18 column (150×3.2, 5 μm C18 silica), supplied by Alltech was used. The analysis was done at 40° C. using a gradient elution as given in Table 9. Water was used as Eluent A, while Eluent B was acetonitrile. A flow of 0.5 ml/min was used in combination with a UV-VIS detector at 204 nm.

TABLE 9

| Time (min) | % A |
| --- | --- |
| 0 | 55 |
| 6 | 55 |
| 30 | 0 |
| 50 | 0 |
| 51 | 55 |
| 58 | 55 |

Reference solutions of APOTHIOL-6 and TPO-L with a known concentration in acetonitrile were prepared and analysed using the same HPLC-method to allow quantitative determination of APOTHIOL-6 and TPO-L in the extracts. The extractable amounts of acyl phosphine oxide and its degradation products are given by Table 10.

The smell of each sample was evaluated. The averaged score of the three persons judging the smell is given in Table Table 10.

TABLE 10

| Sample | Extractable amount of acylphosphine oxide (mg/m$^2$) | Smell |
| --- | --- | --- |
| SCOMP-2 | 111.5 | 3 |
| SINV-2 | Below the detection limit | 1 |

From Table 10, it becomes immediately apparent that the cured layer SINV-2 using the inventive UV curable inkjet ink INV-2 produces significantly less smell. The very small amount detectable of extractable amount of acylphosphine oxide indicates for the UV cured sample SINV-2 that thiol functionalized acylphosphine oxide photoinitiators are almost completely coupled to the polymeric network while non functionalized acylphosphine oxides remain migrateable to a considerable extent.

A viscosity of 10 mPa·s was measured for the UV curable inkjet ink INV-2 using a Rheometer™ ARG2 at a shear rate of 10 s$^{-1}$ at 40° C. The UV curable inkjet ink INV-2 was jetted at 40° C. on a PET foil and UV cured by transporting it on a belt under a Phoseon™ Fire Line 125 LED curing device with an output wavelength of 395 nm, at a speed of 20 m/min using 4 W output at a distance of 4.5 mm from the LED.

The invention claimed is:
1. An acylphosphine oxide photoinitiator selected from the group consisting of:

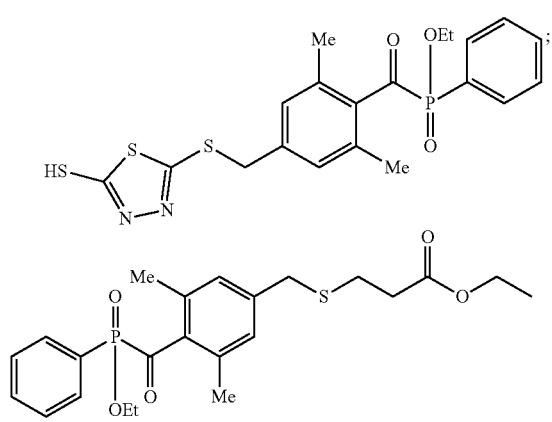

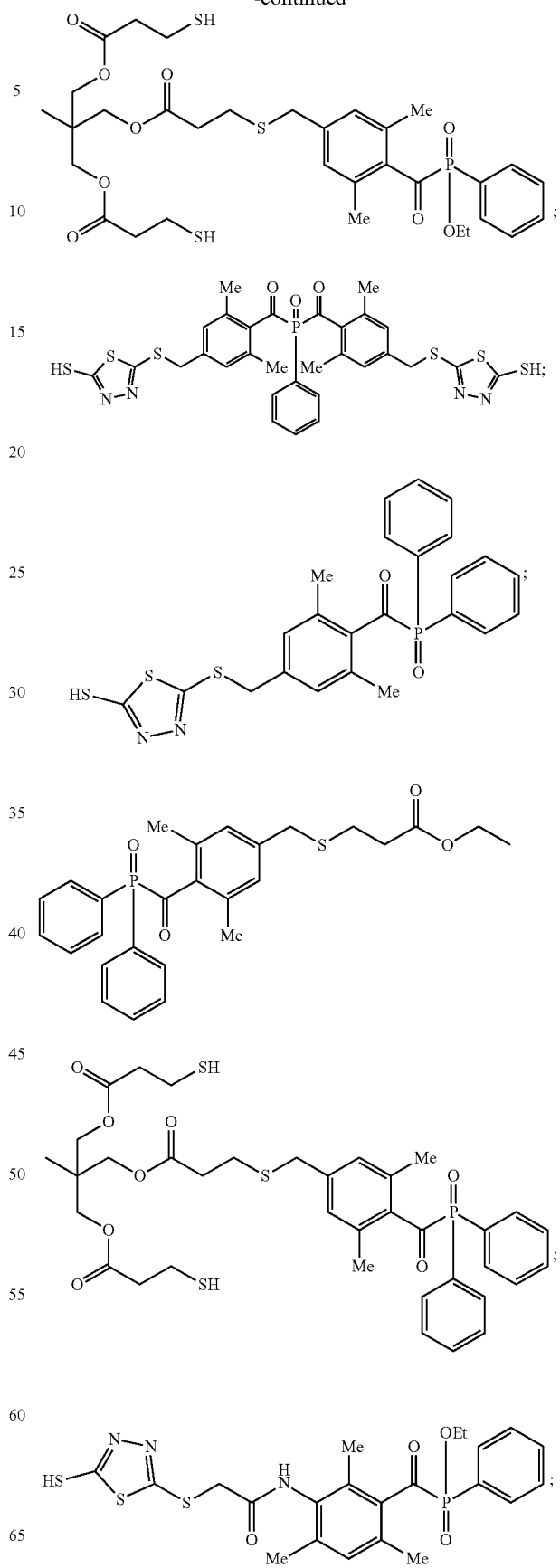

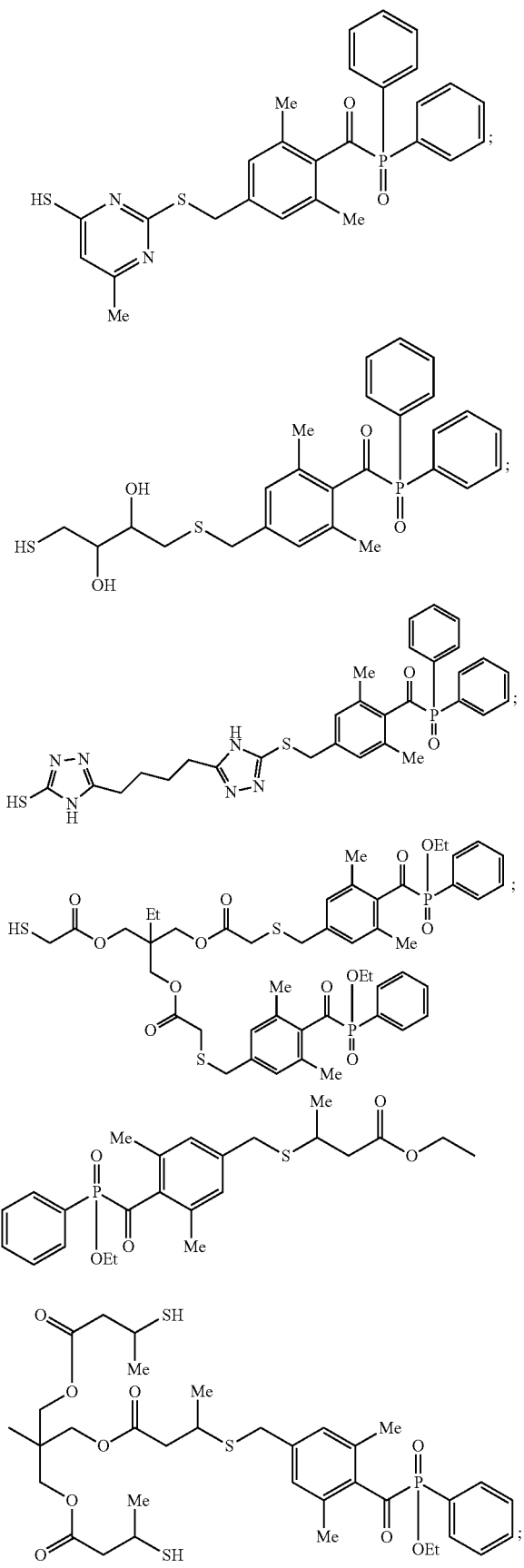

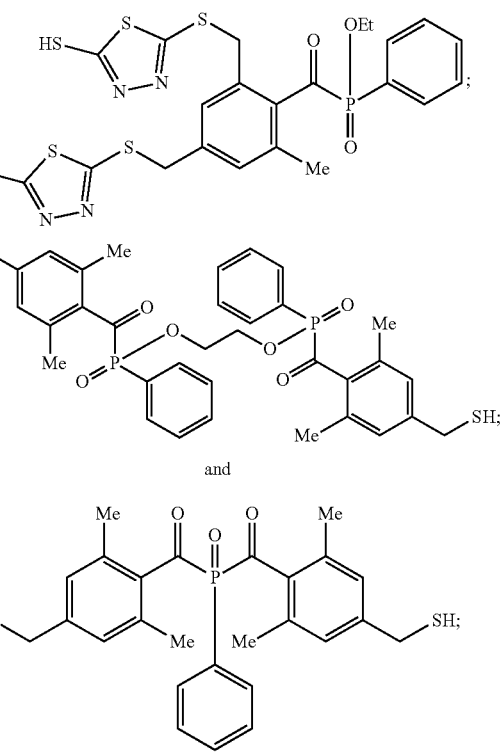

or the acylphosphine oxide photoinitiator is a compound according to Formula (I) or (IV):

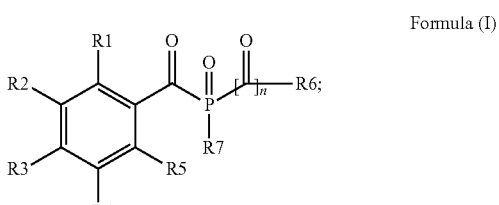

Formula (I)

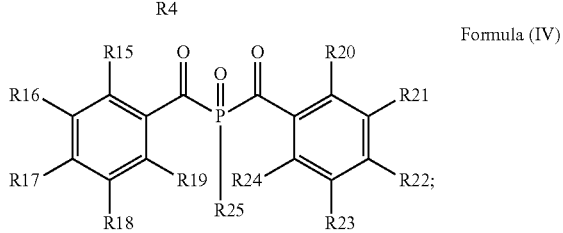

Formula (IV)

wherein n represents an integer having a value of 0 or 1;

R2 is selected from the group consisting of hydrogen, an alkyl group, an alkoxy group, a group according to Formula (I-a), a —NH—C(=O)—R26 group, a —NH—C(=O)—O—R27 group, and a —NH—C(=O)—NH—R28 group;

R26 to R28 are independently selected from the group consisting of an alkyl group, an aryl group, an alkenyl group, an alkynyl group, an alkaryl group, an aralkyl group, and a heteroaryl group;

R1, R3, R4, and R5 are independently selected from the group consisting of hydrogen, an alkyl group, an alkoxy group, and a group according to Formula (I-a);

at least one of R1 to R5 is a group substituted by a thiol or a group according to Formula (I-a):

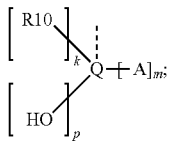

Formula (I-a)

wherein

Q is a z-valent linking group containing 6 to 30 carbon atoms in which z=k+p+m and z≤6, k=1 to z-p-m, p=0 to 2, and m=1 to 5;

A is a group according to Formula (I-b):

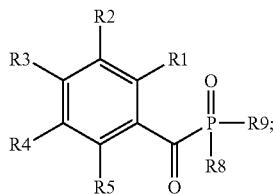

Formula (I-b)

wherein

R1 to R5 have a same meaning as a meaning in Formula (I) in which Q is coupled to the aromatic ring of A in any one of positions occupied by R1 to R5;

R8 and R9 are independently selected from the group consisting of an alkyl group, an aryl group, an alkoxy group, and an aryloxy group;

R10 represents an alkyl group substituted by a thiol or an aryl group substituted by a thiol;

R6 is selected from an alkyl group, an aryl group, an alkoxy group, and an aryloxy group if n=0, and if n=1 R6 represents an alkyl group substituted by a thiol or an aryl group substituted by a thiol;

R7 is selected from the group consisting of an alkyl group, an aryl group, an alkoxy group, an aryloxy group, and a group according to Formula (I-c):

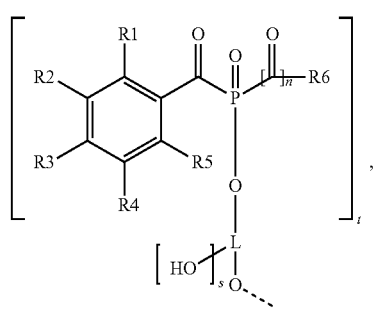

Formula (I-c)

wherein

R1 to R6 and n have a same meaning as a meaning in Formula (I);

s is an integer having a value of 0 to 4;

t is an integer having a value of 1 to 5;

u=s+t+1; and

L represents a u-valent linking group having 2 to 16 carbon atoms;

R16 and R21 are independently selected from the group consisting of hydrogen, an alkyl group, an alkoxy group, a group according to Formula (I-a), a —NH—C(=O)—R26 group, a —NH—C(=O)—O—R27 group, and a —NH—C(=)O—NH—R28 group;

R26 to R28 are independently selected from the group consisting of an alkyl group, an aryl group, an alkenyl group, an alkynyl group, an alkaryl group, an aralkyl group, and a heteroaryl group;

R15, R17 to R20, and R22 to R24 are independently selected from the group consisting of hydrogen, an alkyl group, and an alkoxy group;

at least one of R15 to R19 is a group substituted by a thiol and at least one of R20 to R24 is a group substituted by a thiol; and R25 is selected from the group consisting of an alkyl group, an alkenyl group, an alkynyl group, an alkaryl group, an aralkyl group, an aryl group, a heteroaryl group, an alkoxy group, and an aryloxy group;

wherein one or more of the groups R5, R6, R10, and R15 to R24 are substituted by a thiol represented by Formula (II):

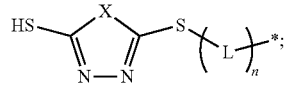

Formula (II)

wherein

* represents a point of attachment;

X is selected from the group consisting of O, S, and NR11;

L represents a divalent linking group including no more than 15 carbon atoms;

n represents 0 or 1;

R11 is selected from the group consisting of a hydrogen, an alkyl group, an alkenyl group, an alkynyl group, an alkaryl group, an aralkyl group, an aryl or heteroaryl group, and NR12R13;

R12 and R13 are independently selected from the group consisting of a hydrogen, an alkyl group, an alkenyl group, an alkynyl group, an alkaryl group, an aralkyl group, an aryl, a heteroaryl group, and an acyl group;

or one of the groups R3, R4, R5, R6, R10, and R15 to R24 are substituted by a thiol represented by Formula (III):

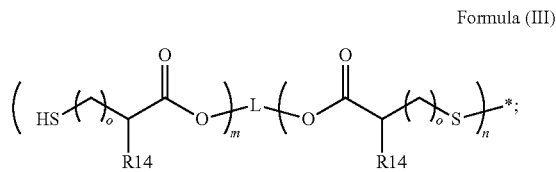

Formula (III)

wherein

* represents a point of attachment;

o represents an integer selected from 0 and 1;

m and n independently represent an integer selected from 1 to 5;

L represents an n+m-valent linking group including no more than 15 carbon atoms; and R14 is selected from the group consisting of a hydrogen and an alkyl group.

2. The acylphosphine oxide photoinitiator according to claim 1, wherein the at least one of the R1 to R5 groups substituted by a thiol is R3.

3. The acylphosphine oxide photoinitiator according to claim 2, wherein R1 and R5 represent methyl.

4. The acylphosphine oxide photoinitiator according to claim 1, wherein R2 and R4 represent hydrogen.

5. The acylphosphine oxide photoinitiator according to claim 1, wherein R14 is selected from the group consisting of a hydrogen and a methyl group; and in Formula (III), n and m are represented by an integer selected from 1 to 3, and L represents a tri- or tetra-valent linking group.

6. A UV curable inkjet ink comprising:
an acylphosphine oxide photoinitiator; and
a polymerizable compound; wherein
the acylphosphine oxide photoinitiator includes one or more acyl groups substituted by a thiol according to claim 1.

7. The UV curable inkjet ink according to claim 6, wherein the polymerizable compound includes one or more polymerizable groups selected from the group consisting of an acrylamide, a methacrylamide, a vinyl ether group, a vinyl ester group, an allyl ether group, an allyl ester group, a vinyl carbonate group, and an alkyne group.

8. The UV curable inkjet ink according to claim 6, further comprising a color pigment and/or a polymerizable or polymeric thioxanthone photoinitiator.

9. A printed article comprising:
a substrate; and
the UV curable inkjet ink according to claim 6; wherein
the substrate is selected from the group consisting of polyethylene terephthalate, aluminum, and glass.

10. An inkjet printing method comprising the steps of:
jetting a UV curable inkjet ink according to claim 6 on a substrate; and
at least partially UV curing the UV curable inkjet ink jetted on the substrate with UV LEDs.

* * * * *